United States Patent
Kumar et al.

(10) Patent No.: US 6,749,648 B1
(45) Date of Patent: Jun. 15, 2004

(54) LITHIUM METAL OXIDES

(75) Inventors: Sujeet Kumar, Fremont, CA (US); Craig R. Horne, San Francisco, CA (US)

(73) Assignee: NanaGram Corporation, Fremont, CA (US)

( * ) Notice: Subject to any disclaimer, the term of this patent is extended or adjusted under 35 U.S.C. 154(b) by 0 days.

(21) Appl. No.: 09/595,958

(22) Filed: Jun. 19, 2000

(51) Int. Cl.$^7$ .................. C01D 15/00; C01G 45/12; H01M 4/48; B05D 1/36
(52) U.S. Cl. ............... 29/623.1; 427/203; 423/179.5; 423/599; 429/231.3; 429/231.95
(58) Field of Search ............... 429/231.3, 224; 29/623.1; 427/122–24, 126.3, 203; 423/179.5, 599, 593

(56) References Cited

U.S. PATENT DOCUMENTS

| | | | |
|---|---|---|---|
| 4,366,215 A | 12/1982 | Coetzer et al. | 429/199 |
| 4,687,643 A | 8/1987 | Cortesi et al. | 422/150 |
| 4,770,960 A | 9/1988 | Nagaura et al. | 429/194 |
| 4,980,251 A | 12/1990 | Thackeray et al. | 429/224 |

(List continued on next page.)

FOREIGN PATENT DOCUMENTS

| | | |
|---|---|---|
| EP | 0 117 755 A2 | 9/1984 |
| EP | 0 492 880 A2 | 7/1992 |
| EP | 0 820 113 A1 | 1/1998 |
| EP | 0 837 036 A1 | 4/1998 |

(List continued on next page.)

OTHER PUBLICATIONS

Oak Ridge National Laboratory, "Thin Film Rechargeable Lithium and Lithium–Ion Batteries", Sep. 1999, 19 pages.
Relationship between Chemical Bonding Nature and Electrochemical Property of $LiMn_2O_4$ Spinel Oxides with Various Particle Sizes: "Electrochemical Grafting" Concept by Nadine Treuil et al., *J. Phys. Chem. B*, vol. 103, No. 12, 1999, pp. 2100–2106.

(List continued on next page.)

*Primary Examiner*—Mark Ruthkosky
(74) *Attorney, Agent, or Firm*—Patterson, Thuente, Skaar & Christensen, P.A.; Peter S. Dardi

(57) ABSTRACT

Lithium metal oxide particles have been produced having average diameters less than about 100 nm. Composite metal oxides of particular interest include, for example, lithium cobalt oxide, lithium nickel oxide, lithium titanium oxides and derivatives thereof. These nanoparticles composite metal oxides can be used as electroactive particles in lithium or lithium ion batteries. Batteries of particular interest include lithium titanium oxide in the negative electrode and lithium cobalt manganese oxide in the positive electrode.

45 Claims, 25 Drawing Sheets

U.S. PATENT DOCUMENTS

| | | | |
|---|---|---|---|
| 5,013,706 A | 5/1991 | Schramm et al. | 502/309 |
| 5,017,446 A | 5/1991 | Reichman et al. | 421/225 |
| 5,211,933 A | 5/1993 | Barboux et al. | |
| 5,264,201 A * | 11/1993 | Dahn | 423/594 |
| 5,273,848 A | 12/1993 | Noguchi et al. | 429/218 |
| 5,290,592 A * | 3/1994 | Izuchi | 427/203 |
| 5,312,611 A | 5/1994 | Takami et al. | 423/447.6 |
| 5,425,932 A | 6/1995 | Tarascon | 423/599 |
| 5,443,809 A | 8/1995 | Olsen | 423/592 |
| 5,464,708 A | 11/1995 | Neat et al. | 429/218 |
| 5,478,672 A | 12/1995 | Mitate | 429/194 |
| 5,478,675 A | 12/1995 | Nagaura | 429/224 |
| 5,486,346 A | 1/1996 | Fey | 423/594 |
| 5,589,300 A * | 12/1996 | Fauteux | 429/218 |
| 5,591,546 A | 1/1997 | Nagaura | |
| 5,601,796 A | 2/1997 | Frech et al. | 423/599 |
| 5,614,472 A | 3/1997 | Riddle et al. | 505/425 |
| 5,631,105 A | 5/1997 | Hasegawa et al. | 429/194 |
| 5,641,465 A | 6/1997 | Ellgen et al. | 423/50 |
| 5,641,468 A | 6/1997 | Ellgen et al. | 423/599 |
| 5,674,644 A | 10/1997 | Nazri | 429/224 |
| 5,677,087 A | 10/1997 | Amine et al. | |
| 5,695,887 A | 12/1997 | Amatucci et al. | 429/48 |
| 5,750,288 A * | 5/1998 | Xie | 429/229 |
| 5,759,720 A | 6/1998 | Amatucci | 429/224 |
| 5,770,018 A | 6/1998 | Saidi | 204/157.15 |
| 5,783,333 A * | 7/1998 | Mayer | 429/223 |
| 5,795,558 A * | 8/1998 | Aoki | 423/594 |
| 5,807,646 A | 9/1998 | Iwata et al. | 429/224 |
| 5,824,434 A * | 10/1998 | Kawakami | 429/209 |
| 5,874,058 A | 2/1999 | Sheargold et al. | 423/599 |
| 5,883,032 A | 3/1999 | Bogdan et al. | 502/66 |
| 5,905,000 A | 5/1999 | Yadav et al. | 429/33 |
| 5,911,920 A | 6/1999 | Hasezaki et al. | 252/518.1 |
| 5,928,622 A | 7/1999 | Hwang et al. | 423/594 |
| 5,952,125 A | 9/1999 | Bi et al. | 429/231.2 |
| 5,958,361 A | 9/1999 | Laine et al. | 423/592 |
| 5,965,293 A | 10/1999 | Idota et al. | |
| 5,989,514 A | 11/1999 | Bi et al. | 423/592 |
| 6,127,065 A | 10/2000 | Yamamoto et al. | |
| 6,136,287 A | 10/2000 | Horne et al. | |
| 6,165,642 A | 12/2000 | Kawakami et al. | |
| 6,268,085 B1 | 7/2001 | Manthiram et al. | |

FOREIGN PATENT DOCUMENTS

| | | |
|---|---|---|
| GB | 2 299 988 A | 10/1996 |
| JP | 2296732 A | 12/1990 |
| WO | WO 96/12676 | 5/1996 |
| WO | WO 97/20773 | 6/1997 |
| WO | WO 97/37935 | 10/1997 |
| WO | WO 00-27754 | 5/2000 |
| WO | WO 00-46867 | 8/2000 |

OTHER PUBLICATIONS

"Nanocomposite Manganese Oxides for Rechargeable Lithium Batteries" by H. Kim et al., *Electrochemical and Solid–State Letters*, 1 (5), pp. 207–209, 1998.

"Zero–Strain Insertion Material of Li [Li$_{1/3}$Ti$_{5/3}$]O$_4$ for Rechargeable Lithium Cells" by Tsutomu Ohzuku et al, *J. Electrochem. Soc.*, vol. 142, No. 5, pp. 1431–1435, May 1995.

"Spinel Anodes for Lithium–Ion Batteries" by E. Ferg et al., *The Electrochemical Society*, vol. 141, No. 11, pp. L147–L150, Nov. 1994.

"Structure and Electrochemistry of the Spinel Oxides LiTi$_2$O$_4$ and Li$_{4/3}$Ti$_{5/3}$O$_4$" by K.M. Colbow et al., *Journal of Power Sources*, 26, pp. 397–403, 1989.

"Preparation of Micron–Sized Li$_4$Ti$_5$O$_{12}$ and its Electrochemistry in Polyacrylonitrile Electrolyte–Based Lithium Cells", by D. Peramunage et al., *J. Electrochemical Society*, vol. 145, No. 8, pp. 2609–2622, Aug. 1998.

"Lithium insertion into vanadium oxide bronze containing nickel" by M. Inagaki et al., *Solid State Ionics* 78, pp. 275–279, Feb. 1995.

"Electrochemistry of Anodes in Solid–State Li–Ion Polymer Batteries", by K. Zaghib et al., *Journal of the Electrochemical Society*, vol. 145, No. 9, pp. 3135–3140, Sep. 1998.

"Effect of Mn–substitution for Co on the crystal structure and acid delithiation of LiMn$_y$Co$_{1-y}$O$_2$ solid soluitons", by R. Stoyanova et al., *Solid State Ionics* 73, pp. 233–240, Jul. 1994.

"A New Lithium Cathode LiCoMnO$_4$: Toward Practical 5 V Lithium Batteries", by Hiroo Kuwai et al., *Electrochemical and Solid–State Letters*, 1 (5), pp. 212–214, 1998.

"Modeling a Porous Intercalation Electrode with Two Characteristic Particle Sizes" by Robert Darling et al., *Journal of the Electrochemical Society*, vol. 144, No. 12, pp. 4201–4208, Dec. 1997.

* cited by examiner

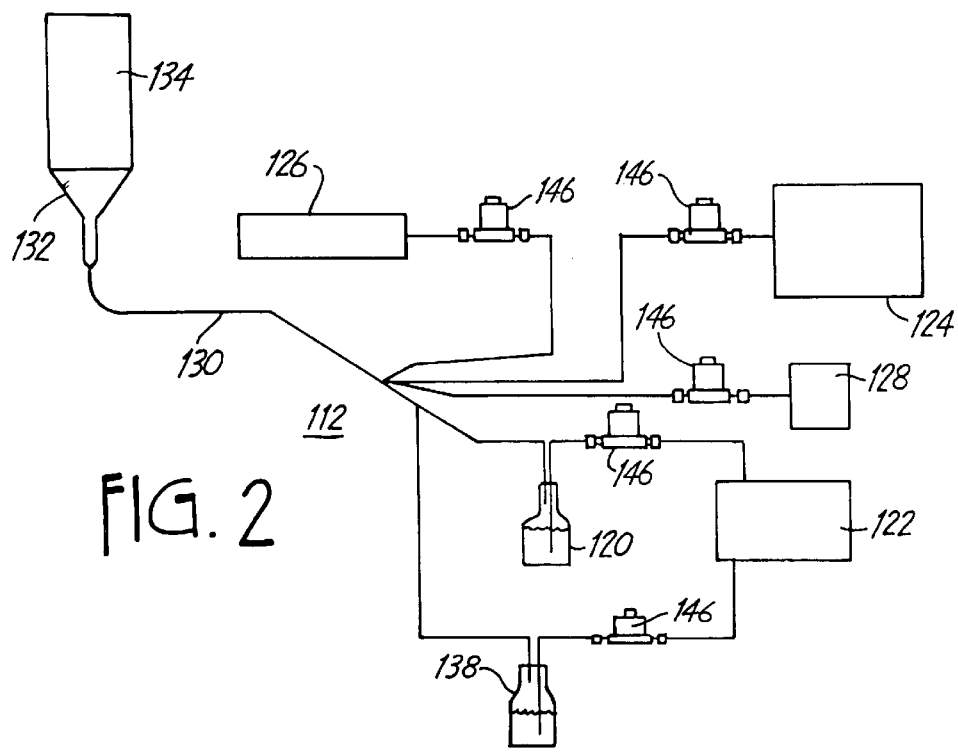

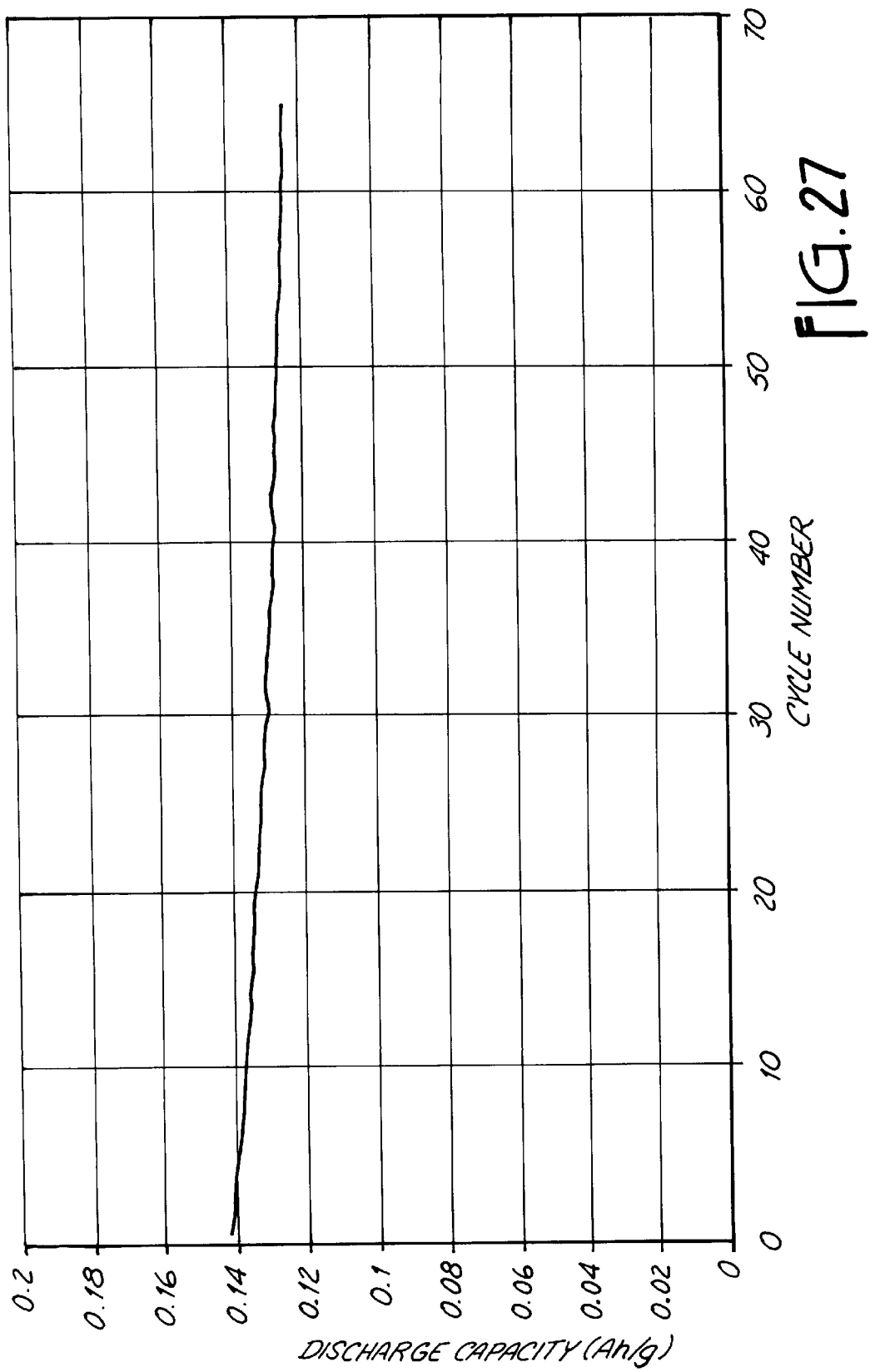

LITHIUM METAL OXIDES

BACKGROUND OF THE INVENTION

The invention relates to nanoparticles of lithium metal oxides, in particular, in which the non-lithium metal includes, for example, cobalt, nickel, titanium, or combinations thereof with one or more additional metals. The invention further relates to electrodes and batteries formed from the lithium metal oxide nanoparticles.

Advances in a variety of fields have created a demand for many types of new materials. In particular, a variety of chemical powders can be used in many different processing contexts, such as the production of batteries. The microminiaturization of electronic components has created widespread growth in the use of portable electronic devices such as cellular phones, pagers, video cameras, facsimile machines, portable stereophonic equipment, personal organizers and personal computers. The growing use of portable electronic equipment has created ever increasing demand for improved power sources for these devices. Relevant batteries include primary batteries, i.e., batteries designed for use through a single charging cycle, and secondary batteries, i.e., batteries designed to be rechargeable. Some batteries designed essentially as primary batteries may be rechargeable to some extent.

Batteries based on lithium have been the subject of considerable development effort and are being sold commercially. Lithium-based batteries generally use electrolytes containing lithium ions. The negative electrodes for these batteries can include lithium metal or alloy (lithium batteries), or compositions that intercalate lithium (lithium ion batteries). Preferred electroactive materials for incorporation into the positive electrodes are compositions that intercalate lithium. The compositions that intercalate lithium, for use in the positive electrodes, generally are chalcogenides such as metal oxides that can incorporate the lithium ions into their lattice.

A variety of lithium metal oxides, such as lithium cobalt oxides, lithium nickel oxides and derivatives thereof have been noted as promising materials for use in positive electrodes for lithium-based batteries. Similarly, lithium titanium oxides have been noted as promising materials for use in negative electrodes for lithium-based batteries. These lithium metal oxides are useful for the production of lithium-based secondary batteries. Because of the interest in lithium metal oxides, several approaches have been developed for producing lithium metal oxide powders.

SUMMARY OF THE INVENTION

In a first aspect, the invention pertains to a collection of particles comprising lithium cobalt oxide or derivatives thereof, the collection of particles having an average diameter less than about 100 nm.

In a further aspect, the invention pertains to a collection of particles comprising lithium nickel oxide or derivatives thereof, the collection of particles having an average diameter less than about 100 nm.

In another aspect, the invention pertains to a collection of particles comprising lithium titanium oxide or derivatives thereof, wherein the collection of particles have an average diameter less than about 100 nm.

Moreover, the invention pertains to batteries formed from nanoparticles of lithium cobalt oxide, lithium nickel oxide, lithium titanium oxide or derivatives thereof.

Furthermore, the invention pertains to a battery comprising an anode and a cathode, the anode comprising lithium titanium oxide and the cathode comprising lithium manganese cobalt oxide.

In a further aspect, the invention pertains to a method of producing lithium metal oxide particles wherein the lithium metal oxide comprises a metal-1 and a metal-2, the method comprising heating precursors particles in an oxidizing atmosphere. The precursor particles being formed by reacting a precursor aerosol, the aerosol comprising precursor compounds of lithium, metal-1 and metal-2. The relative amounts of lithium, metal-1 and metal-2 are selected to yield a desired stoichiometry of the resulting mixed metal oxides.

BRIEF DESCRIPTION OF THE DRAWINGS

FIG. 2 is a schematic, side view of a reactant delivery apparatus for the delivery of vapor reactants to the laser pyrolysis apparatus of FIG. 1.

FIG. 3 is a schematic, side view of a reactant delivery apparatus for the delivery of an aerosol reactant to the laser pyrolysis apparatus of FIG. 1.

FIG. 27 is a plot of specific capacity as a function of discharge cycle for crystalline lithium cobalt oxide nanoparticles.

DETAILED DESCRIPTION OF THE ILLUSTRATIVE EMBODIMENTS

Figure 1:
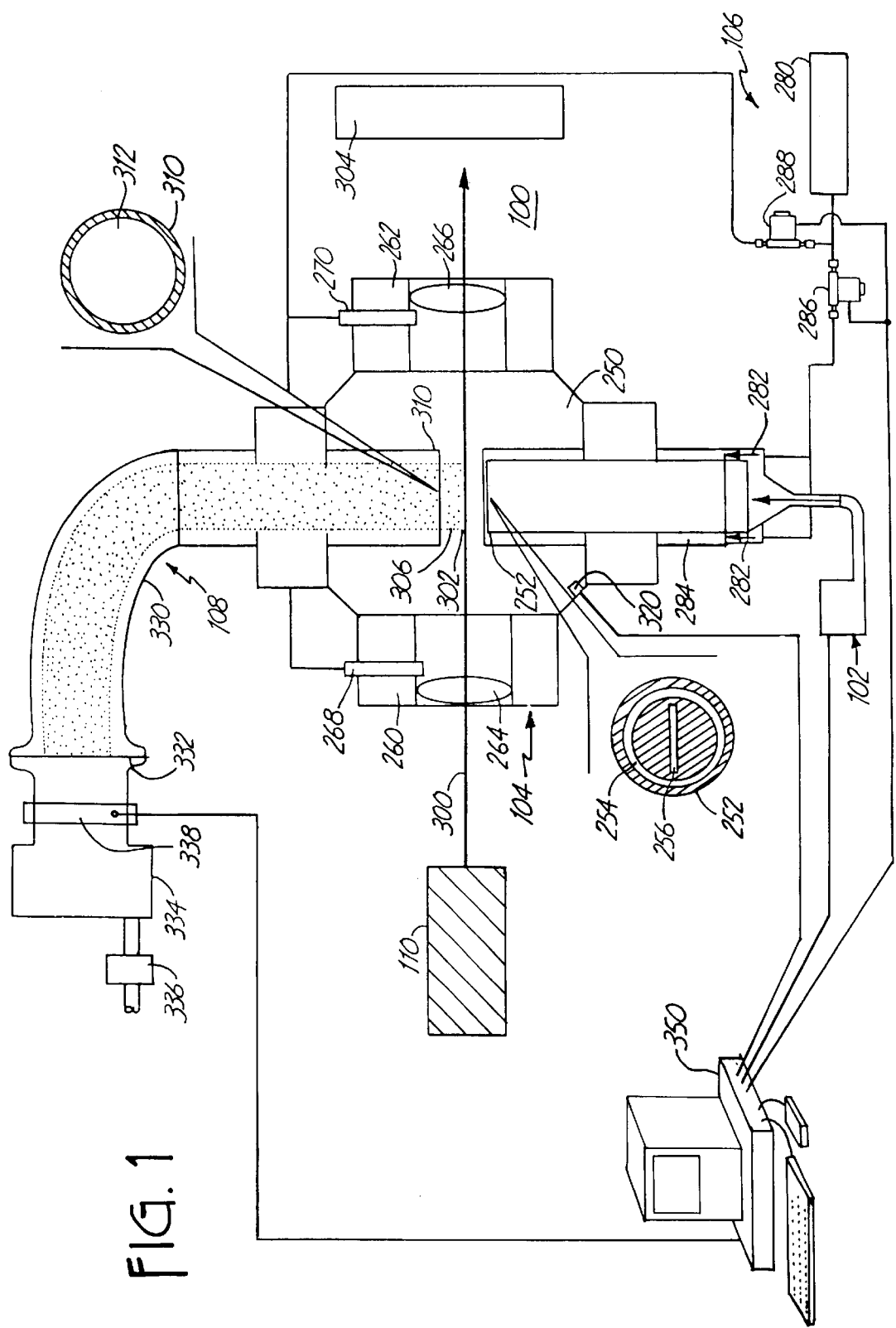
FIG. 1 is a schematic, sectional view of an embodiment of a laser pyrolysis apparatus, where the cross section is taken through the middle of the laser radiation path. The upper insert is a bottom view of the collection nozzle, and the lower insert is a top view of the injection nozzle.

Nanoparticles of lithium cobalt oxides, lithium nickel oxides, lithium titanium oxides and derivatives thereof are particularly valuable materials for the production of lithium-based batteries due to their convenient voltage ranges and reasonable energy densities. In addition, lithium cobalt oxides are advantageous due to their high cycle-ability. Lithium nickel oxides are advantageous due to their high energy densities and high specific capacities. Cobalt substituted lithium nickel oxides can combine some of the advantages of lithium cobalt oxide and lithium nickel oxides. Lithium titanium oxides can be used advantageously in negative electrodes to obtain good cycling properties. The nanoscale particles offer the possibility of producing batteries that achieve excellent performance properties.

Lithium metal oxide nanoparticles can be formed in a two step process using laser pyrolysis to form nanoparticle precursors in combination with a subsequent heat treatment to transform the precursor particles into crystalline lithium metal oxide nanoparticles. The nanoparticle precursors can include crystalline nanoparticles that can be identified by x-ray diffractography and/or amorphous particles whose stoichiometry can only be estimated based on the overall composition of the material.

In the particular embodiments described below in the examples, a mixture of nanoparticles are produced by laser pyrolysis that are precursors to the formation of the ultimate lithium metal oxide. The nanoparticle mixture can be heated under mild conditions to react the particles to produce crystalline particles of the desired lithium metal oxide. The precursors formed in the laser pyrolysis synthesis are selected to yield the desired stoichiometry of the ultimate nanoparticles following heat treatment.

A preferred approach for the formation of suitable nanoscale lithium metal oxide precursor particles involves laser pyrolysis. In particular, laser pyrolysis is an excellent process for efficiently producing lithium metal oxide precursor particles with desirable properties. A basic feature of successful application of laser pyrolysis for the production of lithium metal oxide precursor particles is the generation of a reactant stream containing a lithium compound, a metal precursor compound, a radiation absorber and a secondary reactant as an oxygen source. The reactant stream is pyrolyzed by an intense laser beam. As the reactant stream leaves the laser beam, the particles are rapidly quenched.

To perform laser pyrolysis, reactants can be supplied in vapor form. Alternatively, one or more reactants can be supplied as an aerosol. The use of an aerosol provides for the use of a wider range of metal precursors for laser pyrolysis than are suitable for vapor delivery only. Thus, less expensive precursors can be used with aerosol delivery. Suitable control of the reaction conditions with the aerosol results in nanoscale particles with a narrow particle size distribution. The heat processing of lithium manganese oxide nanoparticle precursors from laser pyrolysis to form lithium manganese oxide nanocrystals is described in copending and commonly assigned U.S. patent application Ser. No. 09/203, 414, now U.S. Pat. No. 6,136,287, Lithium Manganese Oxides and Batteries," incorporated herein by reference.

As noted above, various forms of lithium metal oxides can reversibly intercalate lithium atoms and/or ions. Thus, the lithium metal oxides can function as electroactive material within a lithium-based battery. The lithium metal oxide nanoparticles can be incorporated into a positive electrode film or negative electrode film, as appropriate, with a binder such as a polymer. The film preferably includes additional electrically conductive particles held by the binder along with the lithium metal oxide particles. A positive electrode film can be used in a lithium battery or a lithium ion battery. A negative electrode film can be used in a lithium ion battery. The electrolyte for lithium and lithium ion batteries comprises lithium ions.

Batteries based on lithium metal oxide nanoparticles can have desirable performance characteristics. In particular, the nanoparticles have high charging and discharging rates while achieving good cycle-ability. In addition, the nanoparticles can be used o produce smoother electrodes.

A. Particle Production Using Laser Pyrolysis

Laser pyrolysis has been discovered to be a valuable tool for the production of nanoscale precursor particles for further processing into lithium metal oxide nanoparticles. The precursor nanoparticles generally can include various crystalline and/or amorphous nanoparticles that upon subsequent heating under mild conditions yield crystalline lithium metal oxide nanoparticles. In particular, the precursor nanoparticles, as described in the examples below, with nickel and/or cobalt generally include crystalline phases and may include nickel and/or cobalt metal particles, lithium carbonate and nickel oxide and/or cobalt oxide. The precursor nanoparticles for the production of oxides with lithium and titanium include titanium oxide ($TiO_2$).

The reaction conditions determine the qualities of the particles produced by laser pyrolysis. The reaction conditions for laser pyrolysis can be controlled relatively precisely in order to produce particles with desired properties. The appropriate reaction conditions to produce a certain type of particles generally depend on the design of the particular apparatus. Specific conditions used to produce lithium metal oxide precursor particles in a particular apparatus are described below in the Examples. Furthermore, some general observations on the relationship between reaction conditions and the resulting particles can be made.

Increasing the laser power results in increased reaction temperatures in the reaction region as well as a faster quenching rate. A rapid quenching rate tends to favor production of high energy phases, which may not be obtained with processes near thermal equilibrium. Similarly, increasing the chamber pressure also tends to favor the production of higher energy structures. Also, increasing the concentration of the reactant serving as the oxygen source in the reactant stream favors the production of particles with increased amounts of oxygen.

Reactant flow rate and velocity of the reactant gas stream are inversely related to particle size so that increasing the reactant gas flow rate or velocity tends to result in smaller particle sizes. Laser power also influences particle size with increased laser power favoring larger particle formation for lower melting materials and smaller particle formation for higher melting materials. Also, the growth dynamics of the particles have a significant influence on the size of the resulting particles. In other words, different forms of a product compound have a tendency to form different size particles from other phases under relatively similar conditions. Similarly, in multiphase regions at which populations of particles with different compositions are formed, each population of particles generally has its own characteristic narrow distribution of particle sizes.

Laser pyrolysis has been performed generally with gas/vapor phase reactants. Many metal precursor compounds can be delivered into the reaction chamber as a gas. Appropriate metal precursor compounds for gaseous delivery generally include metal compounds with reasonable vapor pressures, i.e., vapor pressures sufficient to get desired amounts of precursor gas/vapor into the reactant stream. The vessel holding liquid or solid precursor compounds can be heated to increase the vapor pressure of the metal precursor, if desired.

A carrier gas can be bubbled through a liquid precursor to facilitate delivery of a desired amount of precursor vapor. Suitable liquid, cobalt precursors for vapor delivery include, for example, cobalt tricarbonyl nitrosyl ($Co(CO)_3NO$), and cobalt acetate ($Co(OOCCH_3)_3$). Suitable liquid, nickel precursors include, for example, nickel carbonyl ($Ni(CO)_4$). Suitable liquid, titanium precursors include, for example, titanium tetrachloride ($TiCl_4$), titanium n-butoxide ($Ti(OC_4H_9)_4$), titanium ethoxide ($Ti(OC_2H_5)_4$) and titanium isopropoxide ($Ti[OCH(CH_3)_2]_4$). Suitable liquid, aluminum precursors with sufficient vapor pressure of gaseous delivery include, for example, aluminum s-butoxide ($Al(OC_4H_9)_3$).

Suitable solid nickel precursors include, for example, nickel bromide ($NiBr_2$) and nickel iodide ($NiI_2$). Suitable solid titanium precursors include, for example, titanium trichloride ($TiCl_3$) and titanium tetrabromide ($TiBr_4$). A number of suitable solid, aluminum precursor compounds are available including, for example, aluminum chloride ($AlCl_3$), aluminum ethoxide ($Al(OC_2H_5)_3$), and aluminum isopropoxide ($Al[OCH(CH_3)_2]_3$). Solid precursors generally are heated to produce a sufficient vapor pressure. A carrier gas can be passed over the solid precursor to facilitate delivery of the precursor vapor.

The use of exclusively gas phase reactants is somewhat limiting with respect to the types of precursor compounds that can be used conveniently. Thus, techniques have been developed to introduce aerosols containing reactant precursors into laser pyrolysis chambers. Improved aerosol delivery apparatuses for reaction systems are described further in commonly assigned and copending U.S. patent application Ser. No. 09/188,670, now U.S. Pat. No. 6,193,936 to Gardner et al., entitled "Reactant Delivery Apparatuses," filed Nov. 9, 1998, incorporated herein by reference.

Using aerosol delivery apparatuses, solid precursor compounds can be delivered by dissolving the compounds in a solvent. Alternatively, powdered precursor compounds can be dispersed in a liquid/solvent for aerosol delivery. Liquid precursor compounds can be delivered as an aerosol from a neat liquid, a multiple liquid dispersion or a liquid solution. Aerosol reactants can be used to obtain a significant reactant throughput. A solvent/dispersant can be selected to achieve desired properties of the resulting solution/dispersion. Suitable solvents/dispersants include water, methanol, ethanol, isopropyl alcohol, other organic solvents and mixtures thereof. The solvent should have a desired level of purity such that the resulting particles have a desired purity level. Some solvents, such as isopropyl alcohol, are significant absorbers of infrared light from a $CO_2$ laser such that no additional laser absorbing compound may be needed within the reactant stream if a $CO_2$ laser is used as a light source.

If aerosol precursors are formed with a solvent present, the solvent preferably is rapidly evaporated by the light beam in the reaction chamber such that a gas phase reaction can take place. Thus, the fundamental features of the laser pyrolysis reaction are unchanged by the presence of an aerosol. Nevertheless, the reaction conditions are affected by the presence of the aerosol. Below in the Examples, conditions are described for the production of several lithium metal oxide precursor nanoparticles using aerosol precursors in a particular laser pyrolysis reaction chamber. Thus, the parameters associated with aerosol reactant delivery can be explored further based on the description below.

A number of suitable solid, metal precursor compounds can be delivered as an aerosol from solution. For example, cobaltous iodide ($CoI_2$), cobaltous bromide ($CoBr_2$), cobaltous chloride ($CoCl_2$), cobaltous acetate ($Co(CH_3CO_2)_2$) and cobaltous nitrate ($Co(NO_3)_2$) are soluble in water, alcohols and other organic solvents. In addition, nickel acetate ($Ni(CH_3CO_2)_2$), nickel iodide ($Ni_2$) and nickel nitrate ($Ni(NO_3)_2$) are soluble in water. Titanium tetrachloride ($TiCl_4$) is a liquid that can be directly delivered as an aerosol. Also, suitable lithium precursors for aerosol delivery from solution include, for example, lithium acetate ($LiCH_3CO_2$), which is soluble in water and alcohol, lithium chloride (LiCl), which is somewhat soluble in water, alcohol and some other organic solvents, and lithium hydroxide (LiOH) and lithium nitrate ($LiNO_3$), which are somewhat soluble in water and alcohol.

The compounds are dissolved in a solution preferably with a concentration greater than about 0.5 molar. Generally, the greater the concentration of precursor in the solution the greater the throughput of reactant through the reaction chamber. As the concentration increases, however, the solution can become more viscous such that the aerosol may have droplets with larger sizes than desired. Thus, selection of solution concentration can involve a balance of factors in the selection of a preferred solution concentration.

Preferred secondary reactants serving as an oxygen source include, for example, $O_2$, CO, $CO_2$, $O_3$ and mixtures thereof. Oxygen can be supplied as air. The secondary reactant compound should not react significantly with the metal precursor prior to entering the reaction zone since this generally would result in the formation of large particles.

Laser pyrolysis can be performed with a variety of optical frequencies. Preferred light sources operate in the infrared portion of the electromagnetic spectrum. $CO_2$ lasers are particularly preferred sources of light. Infrared absorbers for inclusion in the reactant stream include, for example, $C_2H_4$, isopropyl alcohol, NH3, $SF_6$, $SiH_4$ and $O_3$. $O_3$ can act as both an infrared absorber and as an oxygen source. The radiation absorber, such as the infrared absorber, absorbs energy from the radiation beam and distributes the energy to the other reactants to drive the pyrolysis.

Preferably, the energy absorbed from the light beam increases the temperature at a tremendous rate, many times the rate that heat generally would be produced by exothermic reactions under controlled condition. While the process generally involves nonequilibrium conditions, the temperature can be described approximately based on the energy in the absorbing region. The laser pyrolysis process is qualitatively different from the process in a combustion reactor where an energy source initiates a reaction, but the reaction is driven by energy given off by an exothermic reaction. Thus, while this light driven process is referred to as laser pyrolysis, it is not a thermal process even though traditional pyrolysis is a thermal process.

An inert shielding gas can be used to reduce the amount of reactant and product molecules contacting the reactant chamber components. Inert gases can also be introduced into the reactant stream as a carrier gas and/or as a reaction moderator. Appropriate inert shielding gases include, for example, Ar, He and $N_2$.

An appropriate laser pyrolysis apparatus generally includes a reaction chamber isolated from the ambient environment. A reactant inlet connected to a reactant delivery apparatus produces a reactant stream through the reaction chamber. A laser beam path intersects the reactant stream at a reaction zone. The reactant/product stream continues after the reaction zone to an outlet, where the reactant/product stream exits the reaction chamber and passes into a collection apparatus. Generally, the light source, such as a laser, is located external to the reaction chamber, and the light beam enters the reaction chamber through an appropriate window.

Referring to FIG. 1, a particular embodiment 100 of a laser pyrolysis system involves a reactant delivery apparatus 102, reaction chamber 104, shielding gas delivery apparatus 106, collection apparatus 108 and light source 110. A first reaction delivery apparatus described below can be used to deliver exclusively gaseous reactants. An alternative reactant delivery apparatus is described for delivery of one or more reactants as an aerosol.

Referring to FIG. 2, a first embodiment 112 of reactant delivery apparatus 102 includes a source 120 of a precursor compound. For liquid or solid reactants, a carrier gas from one or more carrier gas sources 122 can be introduced into precursor source 120 to facilitate delivery of the reactant. Precursor source 120 can be a liquid holding container, a solid precursor delivery apparatus or other suitable container. The carrier gas from carrier gas source 122 preferably is either an infrared absorber and/or an inert gas.

The gases from precursor source 120 are mixed with gases from infrared absorber source 124, inert gas source 126 by combining and/or secondary reactant source 128 the gases in a single portion of tubing 130. The gases are combined a sufficient distance from reaction chamber 104 such that the gases become well mixed prior to their entrance into reaction chamber 104. The combined gas in tube 130 passes through a duct 132 into channel 134, which is in fluid communication with reactant inlet 206.

A second reactant can be supplied from second reactant source 138, which can be a liquid reactant delivery apparatus, a solid reactant delivery apparatus, a gas cylinder or other suitable container or containers. As shown in FIG. 2, second reactant source 138 delivers a second reactant to duct 132 by way of tube 130. Mass flow controllers 146 can be used to regulate the flow of gases within the reactant delivery system of FIG. 2.

As noted above, the reactant stream can include one or more aerosols. The aerosols can be formed within reaction chamber 104 or outside of reaction chamber 104 prior to injection into reaction chamber 104. If the aerosols are produced prior to injection into reaction chamber 104, the aerosols can be introduced through reactant inlets comparable to those used for gaseous reactants, such as reactant inlet 134 in FIG. 2.

Referring to FIG. 3, another embodiment 210 of the reactant supply system 102 can be used to supply an aerosol to duct 132. Reactant supply system 210 includes an outer nozzle 212 and an inner nozzle 214. Outer nozzle 212 has an upper channel 216 that leads to a rectangular outlet 218 at the top of outer nozzle 212, as shown in the insert in FIG. 3. Rectangular nozzle has selected dimensions to produce a reactant stream of desired expanse within the reaction chamber. Outer nozzle 212 includes a drain tube 220 in base plate 222. Drain tube 220 is used to remove condensed aerosol from outer nozzle 212. Inner nozzle 214 is secured to outer nozzle 212 at fitting 224.

The top of the nozzle preferably is a twin orifice internal mix atomizer 226. Liquid is fed to the atomizer through tube 228, and gases for introduction into the reaction chamber are fed to the atomizer through tube 230. Interaction of the gas with the liquid assists with droplet formation.

The reaction chamber 104 includes a main chamber 250. Reactant supply system 102 connects to the main chamber 250 at injection nozzle 252. Reaction chamber 104 can be heated to a surface temperature above the dew point of the mixture of reactants and inert components at the pressure in the apparatus.

The end of injection nozzle 252 has an annular opening 254 for the passage of inert shielding gas, and a reactant inlet 256 (left lower insert) for the passage of reactants to form a reactant stream in the reaction chamber. Reactant inlet 256 preferably is a slit, as shown in the lower inserts of FIG. 1. Annular opening 254 has, for example, a diameter of about 1.5 inches and a width along the radial direction from about ⅛ in to about 1/16 in. The flow of shielding gas through annular opening 254 helps to prevent the spread of the reactant gases and product particles throughout reaction chamber 104.

Tubular sections 260, 262 are located on either side of injection nozzle 252. Tubular sections 260, 262 include ZnSe windows 264, 266, respectively. Windows 264, 266 are about 1 inch in diameter. Windows 264, 266 are preferably cylindrical lenses with a focal length equal to the distance between the center of the chamber to the surface of the lens to focus the light beam to a point just below the center of the nozzle opening. Windows 264, 266 preferably have an antireflective coating. Appropriate ZnSe lenses are available from Laser Power Optics, San Diego, Calif. Tubular sections 260, 262 provide for the displacement of windows 264, 266 away from main chamber 250 such that windows 264, 266 are less likely to be contaminated by reactants and/or products. Window 264, 266 are displaced, for example, about 3 cm from the edge of the main chamber 250.

Windows 264, 266 are sealed with a rubber o-ring to tubular sections 260, 262 to prevent the flow of ambient air into reaction chamber 104. Tubular inlets 268, 270 provide for the flow of shielding gas into tubular sections 260, 262 to reduce the contamination of windows 264, 266. Tubular inlets 268, 270 are connected to shielding gas delivery apparatus 106.

Referring to FIG. 1, shielding gas delivery system 106 includes inert gas source 280 connected to an inert gas duct 282. Inert gas duct 282 flows into annular channel 284 leading to annular opening 254. A mass flow controller 286 regulates the flow of inert gas into inert gas duct 282. If reactant delivery system 112 of FIG. 2 is used, inert gas source 126 can also function as the inert gas source for duct 282, if desired. Referring to FIG. 1, inert gas source 280 or a separate inert gas source can be used to supply inert gas to tubes 268, 270. Flow to tubes 268, 270 preferably is controlled by a mass flow controller 288.

Light source 110 is aligned to generate a light beam 300 that enters window 264 and exits window 266. Windows 264, 266 define a light path through main chamber 250 intersecting the flow of reactants at reaction zone 302. After exiting window 266, light beam 300 strikes power meter 304, which also acts as a beam dump. An appropriate power meter is available from Coherent Inc., Santa Clara, Calif. Light source 110 can be a laser or an intense conventional light source such as an arc lamp. Preferably, light source 110 is an infrared laser, especially a CW $CO_2$ laser such as an 1800 watt maximum power output laser available from PRC Corp., Landing, N.J.

Reactants passing through reactant inlet 256 in injection nozzle 252 initiate a reactant stream. The reactant stream passes through reaction zone 302, where reaction involving the metal precursor compounds takes place. Heating of the gases in reaction zone 302 is extremely rapid, roughly on the order of $10^5$ degree C./sec depending on the specific conditions. The reaction is rapidly quenched upon leaving reaction zone 302, and particles 306 are formed in the reactant/product stream. The nonequilibrium nature of the process allows for the production of nanoparticles with a highly uniform size distribution and structural homogeneity.

The path of the reactant stream continues to collection nozzle 310. Collection nozzle 310 has a circular opening 312, as shown in the upper insert of FIG. 1. Circular opening 312 feeds into collection system 108.

The chamber pressure is monitored with a pressure gauge 320 attached to the main chamber. The preferred chamber pressure for the production of the desired oxides generally ranges from about 80 Torr to about 650 Torr.

Collection system 108 preferably includes a curved channel 330 leading from collection nozzle 310. Because of the small size of the particles, the product particles follow the flow of the gas around curves. Collection system 108 includes a filter 332 within the gas flow to collect the product particles. Due to curved section 330, the filter is not supported directly above the chamber. A variety of materials such as Teflon® (polytetrafluoroethylene), glass fibers and the like can be used for the filter as long as the material is inert and has a fine enough mesh to trap the particles. Preferred materials for the filter include, for example, a glass fiber filter from ACE Glass Inc., Vineland, N.J. and cylindrical Nomex® filters from AF Equipment Co., Sunnyvale, Calif.

Pump 334 is used to maintain collection system 108 at a selected pressure. It may be desirable to flow the exhaust of the pump through a scrubber 336 to remove any remaining reactive chemicals before venting into the atmosphere.

The pumping rate is controlled by either a manual needle valve or an automatic throttle valve 338 inserted between pump 334 and filter 332. As the chamber pressure increases due to the accumulation of particles on filter 332, the manual valve or the throttle valve can be adjusted to maintain the pumping rate and the corresponding chamber pressure.

The apparatus is controlled by a computer 350. Generally, the computer controls the light source and monitors the pressure in the reaction chamber. The computer can be used to control the flow of reactants and/or the shielding gas.

The reaction can be continued until sufficient particles are collected on filter 332 such that pump 334 can no longer maintain the desired pressure in the reaction chamber 104 against the resistance through filter 332. When the pressure in reaction chamber 104 can no longer be maintained at the desired value, the reaction is stopped, and filter 332 is removed. With this embodiment, about 1–300 grams of particles can be collected in a single run before the chamber pressure can no longer be maintained. A single run generally can last up to about 10 hours depending on the reactant delivery system, the type of particle being produced and the type of filter being used.

Figure 4:
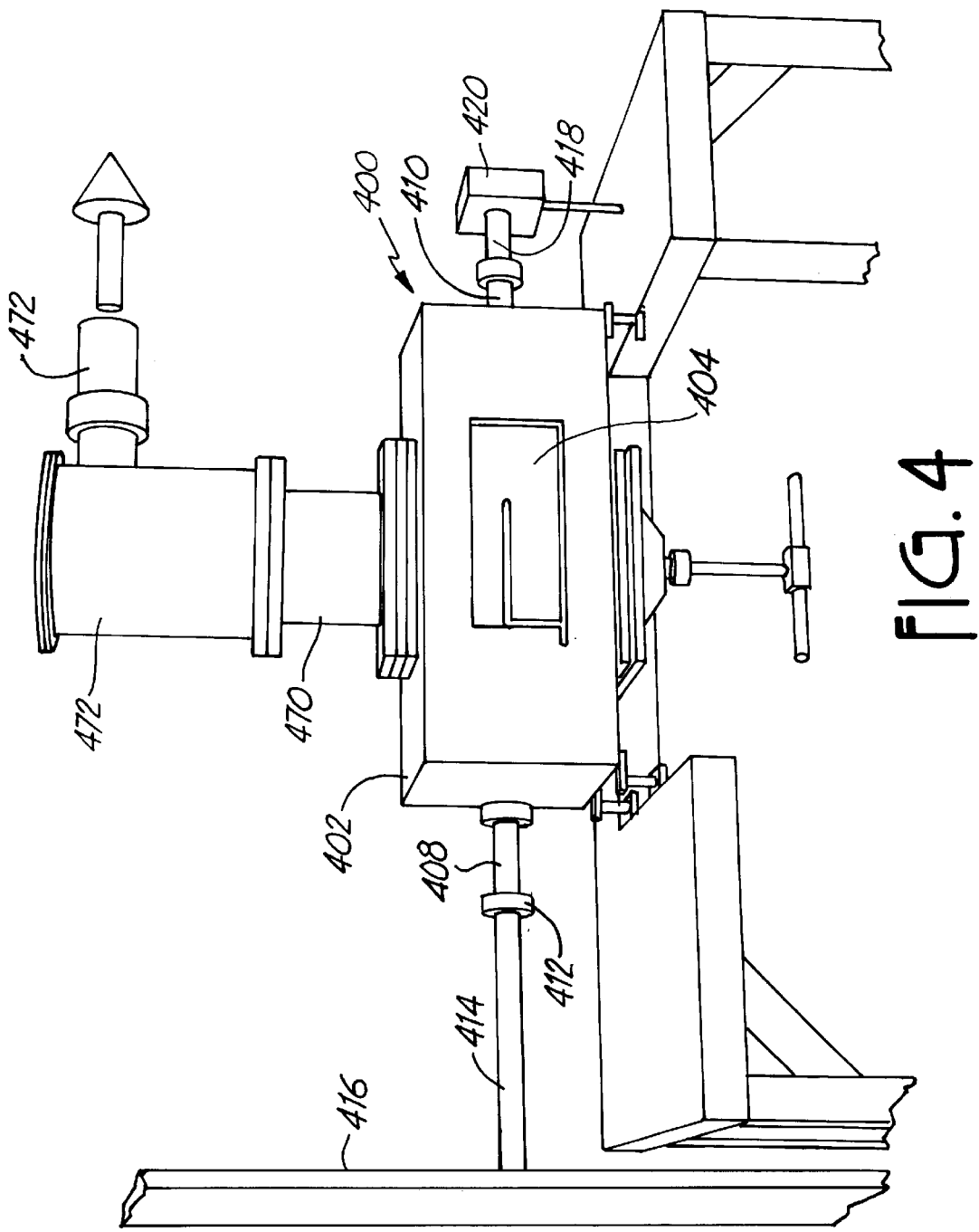
FIG. 4 is a perspective view of an alternative embodiment of a laser pyrolysis apparatus.

An alternative embodiment of a laser pyrolysis apparatus is shown in FIG. 4. Laser pyrolysis apparatus 400 includes a reaction chamber 402. The reaction chamber 402 has a shape of a rectangular parallelapiped. Reaction chamber 402 extends with its longest dimension along the laser beam. Reaction chamber 402 has a viewing window 404 at its side, such that the reaction zone can be observed during operation.

Reaction chamber 402 has tubular extensions 408, 410 that define an optical path through the reaction chamber. Tubular extension 408 is connected with a seal to a cylindrical lens 412. Tube 414 connects laser 416 or other optical source with lens 412. Similarly, Tubular extension 410 is connected with a seal to tube 418, which further leads to beam dump/light meter 420. Thus, the entire light path from laser 416 to beam dump 420 is enclosed.

Inlet nozzle 426 connects with reaction chamber 402 at its lower surface 428. Inlet nozzle 426 includes a plate 430 that bolts into lower surface 428 to secure inlet nozzle 426. Inlet nozzle 426 includes an inner nozzle 432 and an outer nozzle 434. Inner nozzle 432 preferably has a twin orifice internal mix atomizer 436 at the top of the nozzle. Suitable gas atomizers are available from Spraying Systems, Wheaton, Ill. The twin orifice internal mix atomizer 436 has a fan shape to produce a thin sheet of aerosol and gaseous precursors. Liquid is fed to the atomizer through tube 438, and gases for introduction into the reaction chamber are fed to the atomizer through tube 440. Interaction of the gas with the liquid assists with droplet formation.

Figure 6:
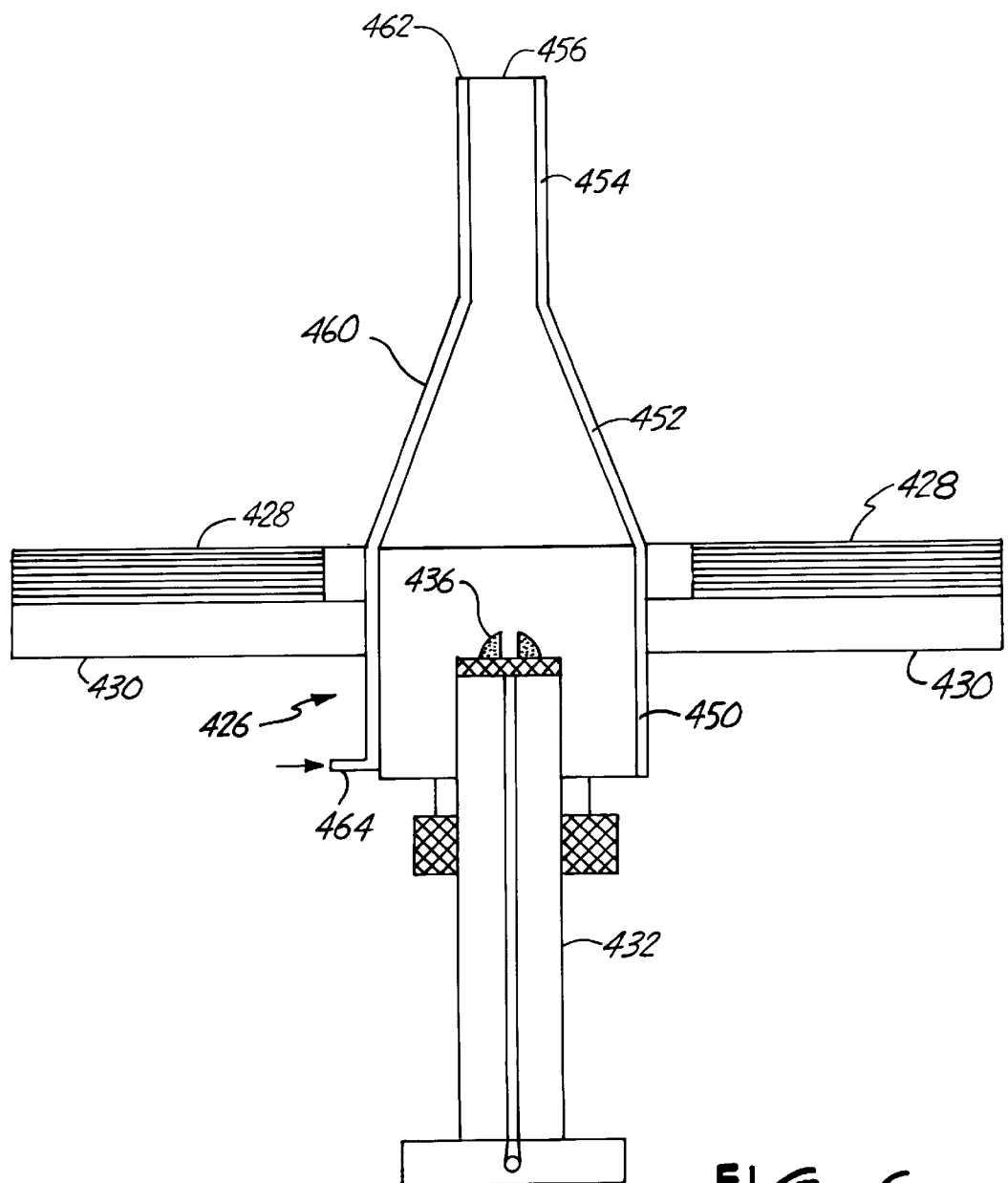
FIG. 6 is a sectional view of the inlet nozzle of the alternative laser pyrolysis apparatus of FIG. 4, the cross section being taken along the width of the nozzle through its center.

Outer nozzle 434 includes a chamber section 450, a funnel section 452 and a delivery section 454. Chamber section 450 holds the atomizer of inner nozzle 432. Funnel section 452 directs the aerosol and gaseous precursors into delivery section 454. Delivery section 450 leads to an about 3 inch by 0.5 inch rectangular outlet 456, shown in the insert of FIG. 6. Outer nozzle 434 includes a drain 458 to remove any liquid that collects in the outer nozzle. Outer nozzle 434 is covered by an outer wall 460 that forms an shielding gas opening 462 surrounding outlet 456. Inert gas is introduced through inlet 464.

Exit nozzle 470 connects to apparatus 400 at the top surface of reaction chamber 402. Exit nozzle 470 leads to filter chamber 472. Filter chamber 472 connects with pipe 474 which leads to a pump. A cylindrical filter is mounted at the opening to pipe 474. Suitable cylindrical filters are described above.

Another alternative design of a laser pyrolysis apparatus has been described in U.S. Pat. No. 5,958,348 to Bi et al., entitled "Efficient Production of Particles by Chemical Reaction," incorporated herein by reference. This alternative design is intended to facilitate production of commercial quantities of particles by laser pyrolysis. Additional embodiments and other appropriate features for commercial capacity laser pyrolysis apparatuses are described in copending and commonly assigned U.S. patent application Ser. No. 09/362,631 to Mosso et al., entitled "Particle Production Apparatus," incorporated herein by reference.

In one preferred embodiment of a commercial capacity laser pyrolysis apparatus, the reaction chamber and reactant inlet are elongated significantly along the light beam to provide for an increase in the throughput of reactants and products. The original design of the apparatus was based on the introduction of purely gaseous reactants. The embodiments described above for the delivery of aerosol reactants can be adapted for the elongated reaction chamber design. Additional embodiments for the introduction of an aerosol with one or more aerosol generators into an elongated reaction chamber is described in commonly assigned and copending U.S. patent application Ser. No. 09/188,670, now U.S. Pat. No. 6,193,936 to Gardner et al., entitled "Reactant Delivery Apparatuses," incorporated herein by reference.

In general, the laser pyrolysis apparatus with the elongated reaction chamber and reactant inlet is designed to reduce contamination of the chamber walls, to increase the production capacity and to make efficient use of resources. To accomplish these objectives, the elongated reaction chamber provides for an increased throughput of reactants and products without a corresponding increase in the dead volume of the chamber. The dead volume of the chamber can become contaminated with unreacted compounds and/or reaction products. Furthermore, an appropriate flow of shielding gas confines the reactants and products within a flow stream through the reaction chamber. The high throughput of reactants makes efficient use of the laser energy.

Figure 7:
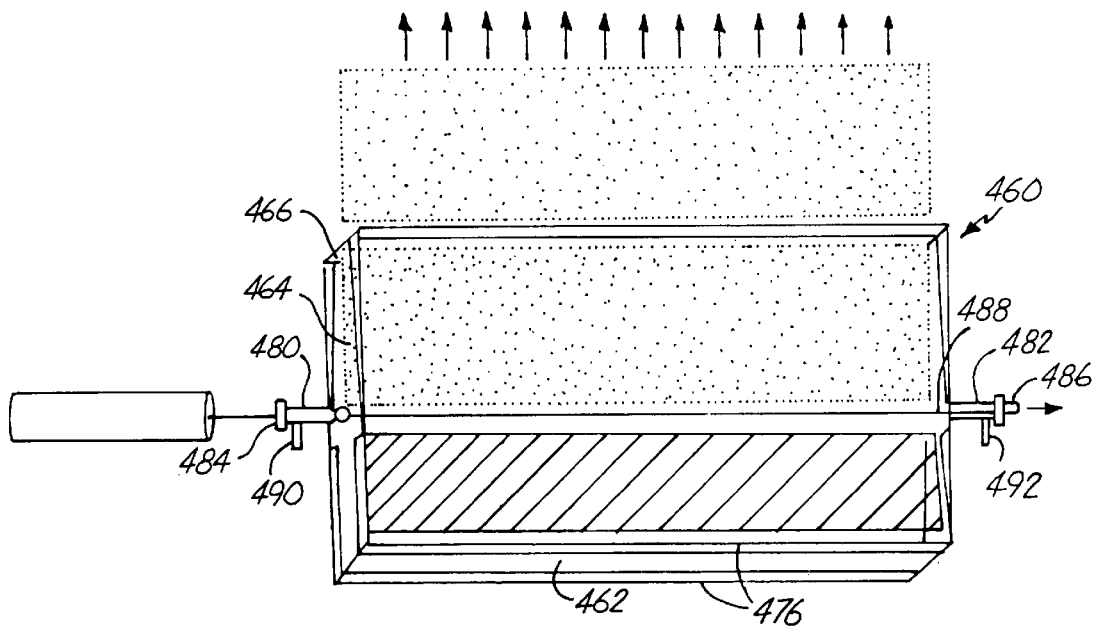
FIG. 7 is a perspective view of an embodiment of an elongated reaction chamber for performing laser pyrolysis.

The design of the improved reaction chamber 460 is shown schematically in FIG. 7. A reactant inlet 462 leads to main chamber 464. Reactant inlet 462 conforms generally to the shape of main chamber 464. Main chamber 464 includes an outlet 466 along the reactant/product stream for removal of particulate products, any unreacted gases and inert gases. Shielding gas inlets 470 are located on both sides of reactant inlet 462. Shielding gas inlets are used to form a blanket of inert gases on the sides of the reactant stream to inhibit contact between the chamber walls and the reactants or products. The dimensions of elongated reaction chamber 464 and reactant inlet 462 preferably are designed for high efficiency particle production. Reasonable dimensions for reactant inlet 462 for the production of ceramic nanoparticles, when used with a 1800 watt $CO_2$ laser, are from about 5 mm to about 1 meter.

Tubular sections 480, 482 extend from the main chamber 464. Tubular sections 480, 482 hold windows 484, 486 to define a light beam path 488 through the reaction chamber 460. Tubular sections 480, 482 can include inert gas inlets 490, 492 for the introduction of inert gas into tubular sections 480, 482.

The improved reaction system includes a collection apparatus to remove the nanoparticles from the reactant stream. The collection system can be designed to collect particles in a batch mode with the collection of a large quantity of particles prior to terminating production. Alternatively, the collection system can be designed to run in a continuous production mode by switching between different particle collectors within the collection apparatus or by providing for removal of particles without exposing the collection system to the ambient atmosphere. A preferred embodiment of a collection apparatus for continuous particle production is described in copending and commonly assigned U.S. patent application Ser. No. 09/107,729, now U.S. Pat. No. 6,270,732 to Gardner et al., entitled "Particle Collection Apparatus And Associated Methods," incorporated herein by reference. The collection apparatus can include curved components within the flow path similar to curved portion of the collection apparatus shown in FIG. 1.

B. Heat Treatment of Nanoparticle Precursors

Significant properties of nanoparticles can be modified by heat processing. Suitable starting material for the heat treatment include particles produced by laser pyrolysis. In addition, particles used as starting material for a heat treatment process can have been subjected to one or more prior heating steps under different conditions. For the heat processing of particles formed by laser pyrolysis, the additional heat processing can improve the crystallinity, remove contaminants, such as elemental carbon, and/or alter the stoichiometry, for example, by incorporation of additional oxygen or of atoms from other gaseous or nongaseous compounds.

Of particular interest, it has been discovered that nanoparticles of lithium metal oxide precursors can be formed by laser pyrolysis. Then, a subsequent heat treatment can be used to convert these materials into crystalline lithium metal oxide nanoparticles. The precursors can include a mixture of materials including, for example, crystalline metal particles, metal oxide particles, lithium carbonate particles and one or more amorphous materials, such as amorphous lithium metal oxides. In preferred embodiments, the heat treatment substantially maintains the nanoscale and size uniformity of the precursor particles.

The starting materials generally can be particles of any size and shape, although nanoscale particles are preferred starting materials. The nanoscale particles have an average diameter of less than about 1000 nm and preferably from about 5 nm to about 500 nm, and more preferably from about 5 nm to about 150 nm. Suitable nanoscale starting materials have been produced by laser pyrolysis.

The nanoparticles are preferably heated in an oven or the like to provide generally uniform heating. The processing conditions generally are mild, such that significant amounts of particle sintering does not occur. Thus, the temperature of heating preferably is low relative to the melting point of at least one starting material and the product material.

The atmosphere over the particles can be static, or gases can be flowed through the system. The atmosphere for the heating process can be an oxidizing atmosphere, a reducing atmosphere or an inert atmosphere. In particular, for conversion of amorphous particles to crystalline particles or from one crystalline structure to a different crystalline structure of essentially the same stoichiometry, the atmosphere generally can be inert. However, for the formation of lithium metal oxide nanoparticles from corresponding precursor particles, the atmosphere preferably is oxidizing, such that the resulting lithium metal oxide particles have a stoichiometric amount of oxygen in the resulting crystalline lattice.

Appropriate oxidizing gases include, for example, $O_2$, $O_3$, CO, $CO_2$, and combinations thereof. The $O_2$ can be supplied as air. Reducing gases include, for example, $H_2$. Oxidizing gases or reducing gases optionally can be mixed with inert gases such as Ar, He and $N_2$. When inert gas is mixed with the oxidizing/reducing gas, the gas mixture can include from about 1 percent oxidizing/reducing gas to about 99 percent oxidizing/reducing gas, and more preferably from about 5 percent oxidizing/reducing gas to about 99 percent oxidizing/reducing gas. Alternatively, either essentially pure oxidizing gas, pure reducing gas or pure inert gas can be used, as desired. Care must be taken with respect to the prevention of explosions when using highly concentrated reducing gases.

The precise conditions can be altered to vary the type of nanoparticles that are produced. For example, the temperature, time of heating, heating and cooling rates, the surrounding gases and the exposure conditions with respect to the gases can all be selected to produce desired product particles. Generally, while heating under an oxidizing atmosphere, the longer the heating period the more oxygen that is incorporated into the material, prior to reaching equilibrium. Once equilibrium conditions are reached, the overall conditions determine the crystalline phase of the powders.

With respect to the heat treatment to form lithium metal oxide particles, the lithium and metal stoichiometries are determined by the laser pyrolysis process, as reflecting in the composition of the precursor particles. The temperature and heat treatment times can be selected to obtain complete reaction to form crystalline lithium metal oxides, in which suitable amounts of oxygen are obtained from the precursor particles and/or the oxidizing atmosphere surrounding the particles during heat treatment. In addition, for example, the temperature, time of heating, heating and cooling rates, the gases and the exposure conditions with respect to the gases can all be selected to yield the desired oxidation state, crystal structure and particle size of the resulting oxide. Generally, the lithium metal oxide precursor nanoparticles are heat treated for sufficient periods to reach equilibrium.

Figure 8:
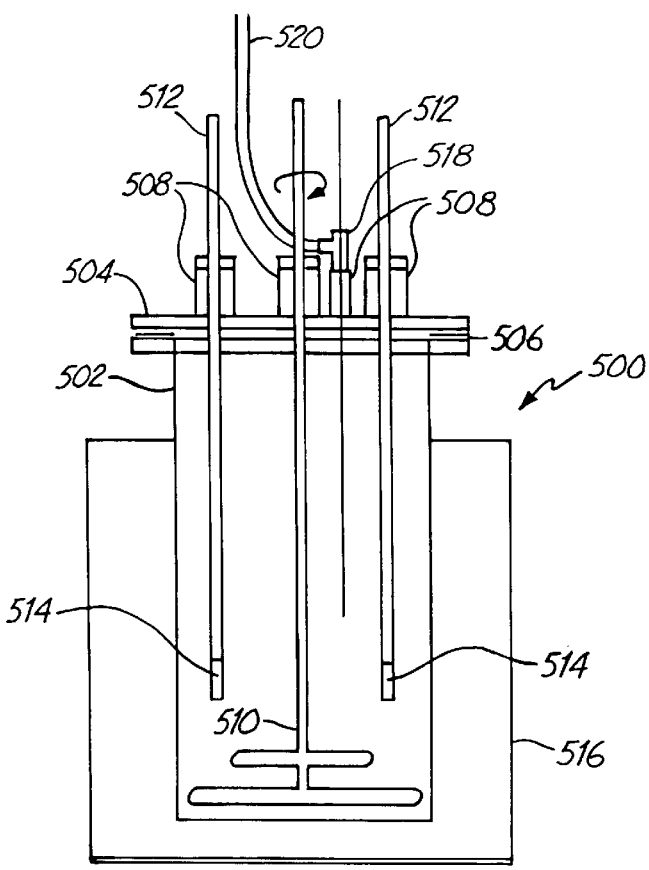
FIG. 8 is a schematic, sectional view of an apparatus for heat treating nanoparticles, in which the section is taken through the center of the apparatus.

A variety of ovens or the like can be used to perform the heating. An example of an apparatus 500 to perform this processing is displayed in FIG. 8. Apparatus 500 includes a jar 502, which can be made from glass or other inert material, into which the particles are placed. Suitable glass reactor jars are available from Ace Glass (Vineland, N.J.). For higher temperatures alloy jars can be used to replace the glass jars. The top of glass jar 502 is sealed to a glass cap 504, with a Teflon® gasket 506 between jar 502 and cap 504. Cap 504 can be held in place with one or more clamps. Cap 504 includes a plurality of ports 508, each with a Teflon® bushing. A multiblade stainless steel stirrer 510 preferably is inserted through a central port 508 in cap 504. Stirrer 510 is connected to a suitable motor.

One or more tubes 512 are inserted through ports 508 for the delivery of gases into jar 502. Tubes 512 can be made from stainless steel or other inert material. Diffusers 514 can be included at the tips of tubes 512 to disburse the gas within jar 502. A heater/furnace 516 generally is placed around jar 502. Suitable resistance heaters are available from Glas-col (Terre Haute, Ind.). One port preferably includes a T-connection 518. The temperature within jar 502 can be measured with a thermocouple 518 inserted through T-connection 518. T-connection 518 can be further connected to a vent 520. Vent 520 provides for the venting of gas circulated through jar 502. Preferably vent 520 is vented to a fume hood or alternative ventilation equipment.

Preferably, desired gases are flowed through jar 502. Tubes 512 generally are connected to an oxidizing gas source and/or an inert gas source. Oxidizing gas, inert gas or a combination thereof to produce the desired atmosphere are placed within jar 502 from the appropriate gas source(s). Various flow rates can be used. The flow rate preferably is between about 1 standard cubic centimeters per minute (sccm) to about 1000 sccm and more preferably from about 10 sccm to about 500 sccm. The flow rate generally is constant through the processing step, although the flow rate and the composition of the gas can be varied systematically over time during processing, if desired. Alternatively, a static gas atmosphere can be used.

Figure 9:
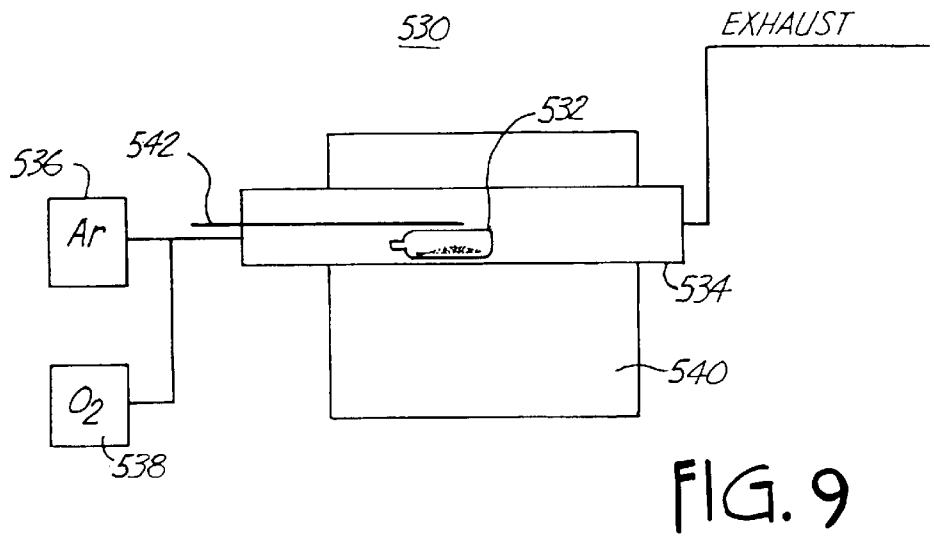
FIG. 9 is a schematic, sectional view of an oven for heating nanoparticles, in which the section is taken through the center of a tube.

An alternative apparatus 530 for the heat treatment of modest quantities of nanoparticles is shown in FIG. 9. The particles are placed within a boat 532 or the like within tube 534. Tube 534 can be produced from, for example, quartz, alumina or zirconia. Preferably, the desired gases are flowed through tube 534. Gases can be supplied for example from inert gas source 536 or oxidizing gas source 538.

Tube 534 is located within oven or furnace 540. Oven 540 can be adapted from a commercial furnace, such as Mini-Mite™ 1100° C. Tube Furnace from Lindberg/Blue M, Asheville, N.C. Oven 540 maintains the relevant portions of the tube at a relatively constant temperature, although the temperature can be varied systematically through the processing step, if desired. The temperature can be monitored with a thermocouple 542.

For the processing of lithium metal oxide precursor nanoparticles into crystalline lithium metal oxide nanoparticles the temperatures generally range from about 50° C. to about 1000° C. and in most circumstances from about 400° C. to about 750° C. The heating generally is continued for greater than about 5 minutes, and typically is continued for from about 10 minutes to about 120 hours, in most circumstances from about 10 minutes to about 5 hours. Preferred heating temperatures and times will depend on the particular starting material and target product. Some empirical adjustment may be required to produce the conditions appropriate for yielding a desired material. The use of mild conditions avoids significant interparticle sintering resulting in larger particle sizes. To prevent particle growth, the particles preferably are heated for short periods of time at high temperatures or for longer periods of time at lower temperatures. Some controlled sintering of the particles can be performed at somewhat higher temperatures to produce slightly larger, average particle diameters.

As noted above, heat treatment can be used to perform a variety of desirable transformations for nanoparticles. For example, the conditions to convert crystalline $VO_2$ to orthorhombic $V_2O_5$ and 2-D crystalline $V_2O_5$, and amorphous $V_2O_5$ to orthorhombic $V_2O_5$ and 2-D crystalline $V_2O_5$ are described in U.S. Pat. No. 5,989,514, to Bi et al., entitled "Processing of Vanadium Oxide Particles With Heat," incorporated herein by reference. Conditions for the removal of carbon coatings from metal oxide nanoparticles is described in copending and commonly assigned U.S. patent application Ser. No. 09/123,255 now U.S. Pat. No. 6,387,531, entitled "Metal (Silicon) Oxide/Carbon Composite Particles," incorporated herein by reference. The incorporation of lithium from a lithium salt into metal oxide nanoparticles in a heat treatment process is described in copending and commonly assigned U.S. patent application Ser. No. 09/311,506, now U.S. Pat. No. 6,394,494 to Reitz et al., entitled "Metal Vanadium Oxide Particles," and copending and commonly assigned U.S. patent application Ser. No. 09/334,203, now U.S. Pat. No. 6,482,374 to Kumar et al., entitled "Reaction Methods for Producing Ternary Particles," both of which are incorporated herein by reference.

C. Properties of the Particles

A collection of particles of interest generally has an average diameter for the primary particles of less than about 500 nm, preferably from about 2 nm to about 100 nm, more preferably from about 5 nm to about 75 nm, and even more preferably from about 5 nm to about 50 nm. Particle diameters generally are evaluated by transmission electron microscopy. Diameter measurements on particles with asymmetries are based on an average of length measurements along the principle axes of the particle.

The primary particles usually have a roughly spherical gross appearance. After heat treatment the particle may be less spherical. Upon closer examination, crystalline particles generally have facets corresponding to the underlying crystal lattice. Nevertheless, crystalline primary particles tend to exhibit growth that is roughly equal in the three physical dimensions to give a gross spherical appearance. Amorphous particles generally have an even more spherical aspect. In preferred embodiments, 95 percent of the primary particles, and preferably 99 percent, have ratios of the dimension along the major axis to the dimension along the minor axis less than about 2.

Because of their small size, the primary particles tend to form loose agglomerates due to van der Waals and other electromagnetic forces between nearby particles. These agglomerates can be dispersed to a significant degree, if desired. Even though the particles form loose agglomerates, the nanometer scale of the primary particles is clearly observable in transmission electron micrographs of the particles. The particles generally have a surface area corresponding to particles on a nanometer scale as observed in the micrographs. Furthermore, the particles can manifest unique properties due to their small size and large surface area per weight of material. For example, vanadium oxide nanoparticles can exhibit surprisingly high energy densities in lithium batteries, as described in U.S. Pat. No. 5,952,125 to Bi et al., entitled "Batteries With Electroactive Nanoparticles," incorporated herein by reference.

The primary particles preferably have a high degree of uniformity in size. Laser pyrolysis, as described above, generally results in particles having a very narrow range of particle diameters. Furthermore, heat processing under suitably mild conditions does not alter the very narrow range of particle diameters. With aerosol delivery of reactants for laser pyrolysis, the distribution of particle diameters is particularly sensitive to the reaction conditions. Nevertheless, if the reaction conditions are properly controlled, a very narrow distribution of particle diameters can be obtained with an aerosol delivery system. As determined from examination of transmission electron micrographs, the primary particles generally have a distribution in sizes such that at least about 95 percent, and preferably 99 percent, of the primary particles have a is diameter greater than about 40 percent of the average diameter and less than about 225 percent of the average diameter. Preferably, the primary particles have a distribution of diameters such that at least about 95 percent, and preferably 99 percent, of the primary particles have a diameter greater than about 45 percent of the average diameter and less than about 200 percent of the average diameter.

Furthermore, in preferred embodiments no primary particles have an average diameter greater than about 5 times the average diameter and preferably 4 times the average diameter, and more preferably 3 times the average diameter. In other words, the particle size distribution effectively does not have a tail indicative of a small number of particles with significantly larger sizes. This is a result of the small reaction region and corresponding rapid quench of the particles. An effective cut off in the tail of the size distribution indicates that there are less than about 1 particle in $10^6$ have a diameter greater than a specified cut off value above the average diameter. Narrow size distributions, lack of a tail in the distributions and the roughly spherical morphology can be exploited in a variety of applications.

In addition, the nanoparticles generally have a very high purity level. The nanoparticles produced by the above described methods are expected to have a purity greater than the reactants because the laser pyrolysis reaction and, when applicable, the crystal formation process tends to exclude contaminants from the particle. Furthermore, crystalline nanoparticles produced by laser pyrolysis have a high degree of crystallinity. Similarly, the crystalline nanoparticles produced by heat processing have a high degree of crystallinity. Certain impurities on the surface of the particles may be removed by heating the particles to achieve not only high crystalline purity but high purity overall.

Lithium cobalt oxide $LiCoO_2$ and lithium nickel oxide $LiNiO_2$ have cobalt and nickel both in a +3 oxidation state. Portions of the cobalt or nickel can be replaced with other metals to improve the cost, properties or performance of the materials in batteries, as described further below. Lithium titanium oxide $LiTi_2O_4$ have titanium in mixed valance states of +3 and +4. In contrast, $Li_4Ti_5O_{12}$ has an oxidation state of +4. These lithium metal oxides can reversibly intercalate lithium atoms into their lattice so that they can cycle in a secondary lithium-based battery. In the examples below, the production of nanoparticles of lithium cobalt oxide, lithium nickel oxide, lithium nickel cobalt oxide, and lithium titanium oxide is described.

In addition to the lithium metal oxide particles described above, lithium manganese oxide nanoparticle have been produced by laser pyrolysis with and without additional heat processing. These particles generally have a very narrow particle size distribution, as described above. The synthesis of lithium manganese oxide nanoparticles is described in copending and commonly assigned U.S. patent applications Ser. No. 09/188,768 now U.S. Pat. No. 6,607,706, entitled "Composite Metal Oxide Particles," Ser. No. 09/203,414, now U.S. Pat. No. 6,136,287, entitled "Lithium Manganese Oxides and Batteries," and Ser. No. 09/334,203, now U.S. Pat. No. 6,482,374 to Kurmar et al., entitled "Reaction Methods for Producing Ternary Particles," all three of which are incorporated herein by reference.

D. Battery Application of Lithium Metal Oxides

Figure 10:
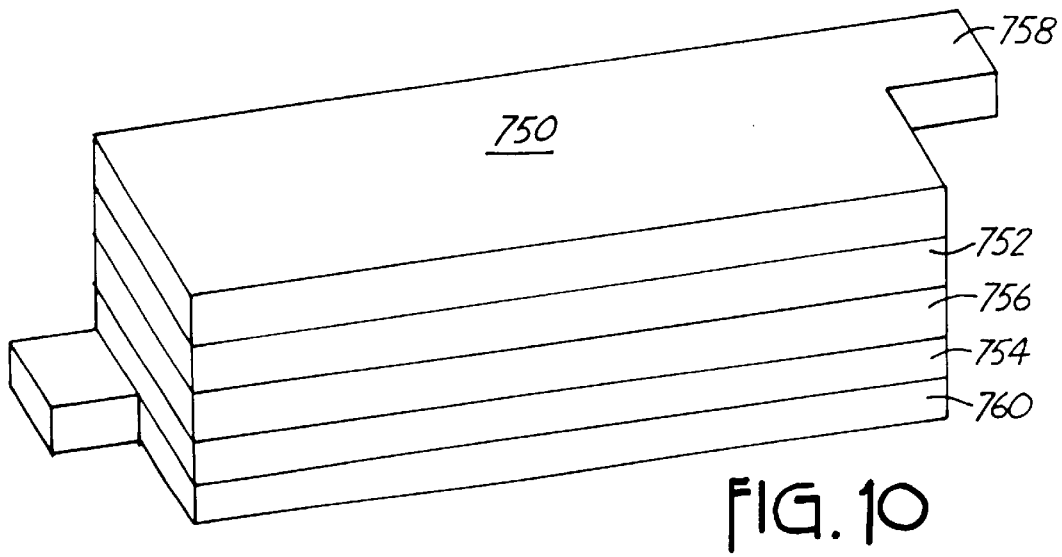
FIG. 10 is a schematic, perspective view of a battery of the invention.

Referring to FIG. 10, battery 750 has an negative electrode 752, a positive electrode 754 and separator 756 between negative electrode 752 and positive electrode 754. A single battery can include multiple positive electrodes and/or negative electrodes. Electrolyte can be supplied in a variety of ways as described further below. Battery 750 preferably includes current collectors 758, 760 associated with negative electrode 752 and positive electrode 754, respectively. Multiple current collectors can be associated with each electrode if desired.

Lithium has been used in reduction/oxidation reactions in batteries because it is the lightest metal and because it is the most electropositive metal. The lithium metal oxide material has lithium ions at lattice positions within the crystal. A variety of lithium metal oxides are known to incorporate additional lithium into its structure through intercalation or similar mechanisms such as topochemical absorption.

Batteries that use lithium metal as the negative electrode are termed lithium batteries, while batteries that use lithium intercalation compounds as the electroactive material in the negative electrode are termed lithium ion batteries. Some additional terms have been used to described other lithium-based batteries that have specific types of electrolyte/separator structures, but herein a reference to lithium ion batteries is used to describe all lithium-based batteries with a lithium intercalation compound in the negative electrode regardless of the nature of the electrolyte and separator.

Several lithium metal oxides are suitable for use as an electroactive composition in positive electrodes of lithium-based batteries. Lithium cobalt oxide $LiCoO_2$ has been used commercially in positive electrodes for the production of lithium-based secondary batteries. Lithium cobalt oxide has a regular layered structure that intercalates lithium and is suitable for use in the production of 4 V batteries. Lithium cobalt oxide has very good cycling properties in secondary batteries. However, cobalt is relatively expensive, and lithium cobalt oxide has a relatively low energy density.

Lithium nickel oxide is less expensive to produce and has a higher energy density than lithium cobalt oxide. Nevertheless, lithium nickel oxide is difficult to synthesize, which results in poor cycling properties. In particular, during charging, lithium nickel oxide is prone to undergo a series of phase transformations. These transformations result in contraction of the crystal, with resulting cracks and cleavages of the particles of electroactive material. Due to significant rearrangement in the crystal lattice and disorder, large losses of capacity can take place. If sufficient lithium is lost during recharging, increasing amounts of nickel is in the +4 oxidation state can lead to thermal instability of the oxide and possible release of oxygen gas.

To help stabilize the cycling of lithium nickel oxide, compounds have been generated where some of the nickel is replaced with one or more other metals. Embodiments of the resulting compounds can be written as $Li_xNi_{1-y}Me_yO_2$, where x is between about 0.8 and 1.0, y generally less than 0.8 and can be between about 0.05 and about 0.5 or between about 0.05 and 0.2, and Me is a suitable metal with an oxidation state equal to +3 or a combination of +2 and +4 in equal proportions. Preferred metals for Me include, for example, cobalt, chromium, boron, aluminum, barium, gallium, strontium, calcium, magnesium, iron, titanium, manganese, vanadium and combinations thereof. One preferred substituted lithium nickel oxide is $LiNi_{0.8}Co_{0.2-y}Al_yO_2$.

For lithium nickel cobalt oxides $Li_xNi_{1-y}Co_yO_2$, increased amounts of cobalt relative to nickel are suitable, with y being as large as 0.5. A thermal process for the formation of these lithium mixed metal oxides is described in U.S. Pat. No. 5,264,201 to Dahn et al., entitled "Lithiated Nickel Dioxide and Secondary Cells Prepared Therefrom," incorporated herein by reference. Batteries formed with lithium mixed metal oxides with a metal substituted for a portion of the nickel in lithium nickel oxide are described in U.S. Pat. No. 5,631,105 to Hasegawa et al., entitled "Non-Aqueous Electrolyte Lithium Secondary Batteries," incorporated herein by reference, and in U.S. Pat. No. 5,795,558 to Aoki et al., entitled "Positive Electrode Active Material For Lithium Secondary Battery Method Of Producing," incorporated herein by reference.

Similarly, nickel has been substituted for a portion of the cobalt in lithium cobalt oxide to form $LiNi_yCo_{1-y}O_2$. The use of the nickel substituted lithium cobalt oxide is described in U.S. Pat. No. 4,770,960 to Nagaura et al., entitled Organic Electrolyte Cell," incorporated herein by reference. Other metals such as Mn, B, Al, Mg, Ba, Sr, Ca, Cr, Fe, V and Ti can also be substituted for a portion of the cobalt in lithium cobalt oxide. In alternative embodiments, approximately half the cobalt is replaced with either nickel or manganese to form $Li_2CoNiO_4$ or $Li_2CoMnO_4$, respectively.

Lithium intercalates into the lattice of the lithium metal oxide particles in the positive electrode during discharge of the battery. Upon discharge, the positive electrode acts as a cathode and the negative electrode acts as an anode. The lithium leaves the lattice of the particles in the positive electrode upon recharging, i.e., when a voltage is applied to the cell such that electric current flows into the positive electrode due to the application of an external EMF to the battery. Appropriate lithium cobalt oxides, lithium nickel oxides and substituted forms thereof can be an effective electroactive material for a positive electrode in either a lithium or lithium ion battery.

Lithium ion batteries use particles in the negative electrode of a composition that can intercalate lithium. Suitable intercalation compounds for the negative electrode include, for example, graphite, synthetic graphite, coke, mesocarbons, doped carbons, fullerenes, niobium pentoxide, tin alloys, $TiO_2$, $SnO_2$, and mixtures and composites thereof. Preferred intercalation compounds for the negative electrode include certain lithium metal oxides. For example, lithium titanium oxide is suitable as a low voltage cathode active material or as a low voltage anode active material. While use of lithium titanium oxide materials in an anode reduces the overall battery voltage, this voltage loss can be compensated for by improved cycling properties.

Suitable lithium titanium oxide has a structure of $Li_xTiO_2$, $0.5 < x \leq 1.0$. Evidently, when the lithium titanium oxide cycles in an anode, it varies from $Li_{0.5}TiO_2$ ($LiTi_2O_4$) and $LiTiO_2$. It has been found that lithium titanium oxide based on the rutile form of titanium oxide ($TiO_2$) cycles better than lithium titanium oxide based on the anatase form of titanium oxide ($TiO_2$), although the lithium titanium oxide material does not maintain the crystal structure of the titanium dioxide material. The improved cycling is based on an hexagonal form of $LiTiO_2$, which seems to be able to loose reversibly up to half its lithium. The cycling of these materials is described in U.S. Pat. No. 5,464,708 to Neat et al., entitled "Titanium Dioxide-Based Material," incorporated herein by reference. Thermal synthesis of $LiTi_2O_4$ is described in U.S. Pat. No. 5,911,920 to Hasezaki et al., entitled "Manufacturing Method For Li Composite Oxides Employed As Electrode Materials In Li Batteries," incorporated herein by reference.

Also, suitable spinel-type lithium titanium oxide particles have been prepared with a formula $Li_{1+x}Ti_{2-x}O_4$, $0 \leq x \leq 1/3$.

The synthesis of these spinel-type lithium titanium oxide particles using thermal methods is described in U.S. Pat. No. 5,591,546 to Nagaura, entitled "Secondary Cell," incorporated herein by reference. In this approach, $Li_2TiO_3$ is formed as an intermediate. As described in this patent, improved cycle-ability was observed with $Li_{1+x}Ti_{2-x}O_4$, with $0.01 \leq x \leq 0.25$. As with the lithium metal oxides for the positive electrodes, substituted forms of lithium titanium oxide can also be used. A preferred aluminum substituted lithium titanium oxide is $Li_4Ti_3Al_2O_{12}$, which is an aluminum substituted form of $Li_4Ti_5O_{12}$. $Li_4Ti_3Al_2O_{12}$ has an advantage of higher theoretical capacity due to the lower atomic weight of aluminum compared with titanium. Another form of aluminum substituted lithium titanium oxide is $LiTiAlO_4$. Generally, aluminum substituted lithium titanium oxides can be written in the forms of $LiTi_{2-y}Al_yO_4$, $0<y \leq 1$, and $Li_4Ti_{5-y}Al_yO_{12}$, $0<y \leq 2$.

Positive electrode 754 preferably includes electroactive lithium metal oxide nanoparticles, such as lithium cobalt oxide nanoparticles, lithium nickel oxide nanoparticles or substituted forms thereof. The electroactive nanoparticles are held together with a binder such as a polymeric binder. Nanoparticles for use in positive electrode 754 generally can have any shape, e.g., roughly spherical nanoparticles or elongated nanoparticles.

Negative electrode 752 can be constructed from a variety of materials that are suitable for use with lithium ion electrolytes. In the case of lithium batteries, the negative electrode can include lithium metal or lithium alloy metal either in the form of a foil, grid or metal particles in a binder. Suitable electroactive lithium intercalation compounds in the form of particles, preferably nanoparticles such as lithium titanium oxide nanoparticles, for use in lithium ion batteries are described above. The particles in the negative electrode generally are held with a binder.

While some electroactive materials are reasonable electrical conductors, an electrode generally includes electrically conductive particles in addition to the electroactive nanoparticles. These supplementary, electrically conductive particles generally are also held by the binder. Suitable electrically conductive particles include conductive carbon particles such as carbon black, metal particles such as silver particles, stainless steel fibers and the like.

High loadings of particles can be achieved in the binder. Particles preferably make up greater than about 80 percent by weight of an electrode, and more preferably greater than about 90 percent by weight. The binder can be any of various suitable polymers such as polyvinylidene fluoride, polyethylene oxide, polyethylene, polypropylene, polytetrafluoro ethylene, polyacrylates, ethylene-(propylene-diene monomer) copolymer (EPDM) and mixtures and copolymers thereof.

Current collectors 758, 760 facilitate flow of electricity from battery 750. Current collectors 758, 760 are electrically conductive and generally made of metal such as nickel, iron, stainless steel, aluminum and copper and can be metal foil or preferably a metal grid. Current collector 758, 760 can be on the surface of their associated electrode or embedded within their associated electrode.

The separator element 756 is electrically insulating and provides for passage of at least some types of ions. For lithium based batteries, the separator must provide for the passage of lithium ions. Ionic transmission through the separator provides for electrical neutrality in the different sections of the cell during discharge and recharge. The separator generally prevents electroactive compounds in the positive electrode from contacting electroactive compounds in the negative electrode.

A variety of materials can be used for the separator. For example, the separator can be formed from glass fibers that form a porous matrix. Preferred separators are formed from polymers such as those suitable for use as binders. Polymer separators can be porous to provide for ionic conduction.

Electrolytes for lithium batteries or lithium ion batteries can include any of a variety of lithium salts. Preferred lithium salts have inert anions and are nontoxic. Suitable lithium salts include, for example, lithium hexafluorophosphate, lithium hexafluoroarsenate, lithiumbis (trifluoromethyl sulfonyl imide), lithium trifluoromethane sulfonate, lithium tris(trifluoromethyl sulfonyl) methide, lithium tetrafluoroborate, lithium perchlorate, lithium tetrachloroaluminate, lithium chloride and lithium perfluorobutane.

If a liquid solvent is used to dissolve the electrolyte, the solvent preferably is inert and does not dissolve the electroactive materials. Generally appropriate solvents include, for example, propylene carbonate, dimethyl carbonate, diethyl carbonate, 2-methyl tetrahydrofuran, dioxolane, tetrahydrofuran, 1,2-dimethoxyethane, ethylene carbonate, γ-butyrolactone, dimethyl sulfoxide, acetonitrile, formamide, dimethylformamide and nitromethane.

Alternatively, polymer separators can be solid electrolytes formed from polymers such as polyethylene oxide. Solid electrolytes incorporate electrolyte into the polymer matrix to provide for ionic conduction without the need for liquid solvent. In addition, solid state separators are possible based on inorganic materials. For example, suitable solid state electrolytes include, for example, lithium phosphorous oxynitride (LIPON), $Li_{0.33}La_{0.56}TiO_3$ (see Brouse et al., J. Power Sources 68:412 (1997), incorporated herein by reference) and $Li_{2x}Sr_{1-2x}M_{0.5-x}Ti_{0.5+x}O_3$ where M is a metal, such as Cr, Fe, Co, Al, In or Y, with a preferred form being $Li_{0.5}Sr_{0.5}$ (Fe or Cr)$_{0.25}Ti_{0.75}O_3$ (see Watanabe, J. Power Sources 68: 421 (1997), incorporated herein by reference). Nanoparticles of the lithium metal oxide solid electrolytes can be produced by the methods described herein. In particular, $Li_{0.33}La_{0.56}TiO_3$ can be formed using the approach for lithium titanium oxide with the inclusion of an appropriate amount of lanthanum precursor. Lanthanum chloride ($LaCl_3$) and lanthanum nitrate ($LaNO_3$) are soluble in water and alcohol and can be delivered as an aerosol precursor into a laser pyrolysis apparatus. These lithium metal oxide solid electrolyte nanoparticles can be deposited as a powder onto an electrode and densified to form a thin film. Because of the small size of the particles, very thin layers can be formed. The other electrode can be laminated to the first electrode with the solid electrolyte powder between the two electrodes. The thickness of the densified solid electrolyte between the electrodes can be adjusted to limit short circuiting and contact between positive and negative electroactive particles to acceptable levels. The formation of thin battery structures based on nanoparticles is described further in copending and commonly assigned U.S. patent application Ser. No. 09/435,748 to Buckley et al., entitled "Electrodes," incorporated herein by reference. Also, the formation of separators from densified nanoparticles is described in U.S. Pat. No. 5,905,000 to Yadev et al., entitled "Nanostructured Ion Conducting Solid Electrolytes," incorporated herein by reference.

The shape of the battery components can be adjusted to be suitable for the desired final product, for example, a coin battery, a rectangular construction or a cylindrical battery.

The battery generally includes a casing with appropriate components in electrical contact with current collectors and/or electrodes of the battery. If a liquid electrolyte is used, the casing should prevent the leakage of the electrolyte. The casing can help to maintain the battery elements in close proximity to each other to reduce electrical and ionic resistances within the battery. A plurality of battery cells can be placed in a single case with the cells connected either in series or in parallel.

PARTICLE SYNTHESIS EXAMPLES

Example 1

Lithium Cobalt Oxide

Figure 5:
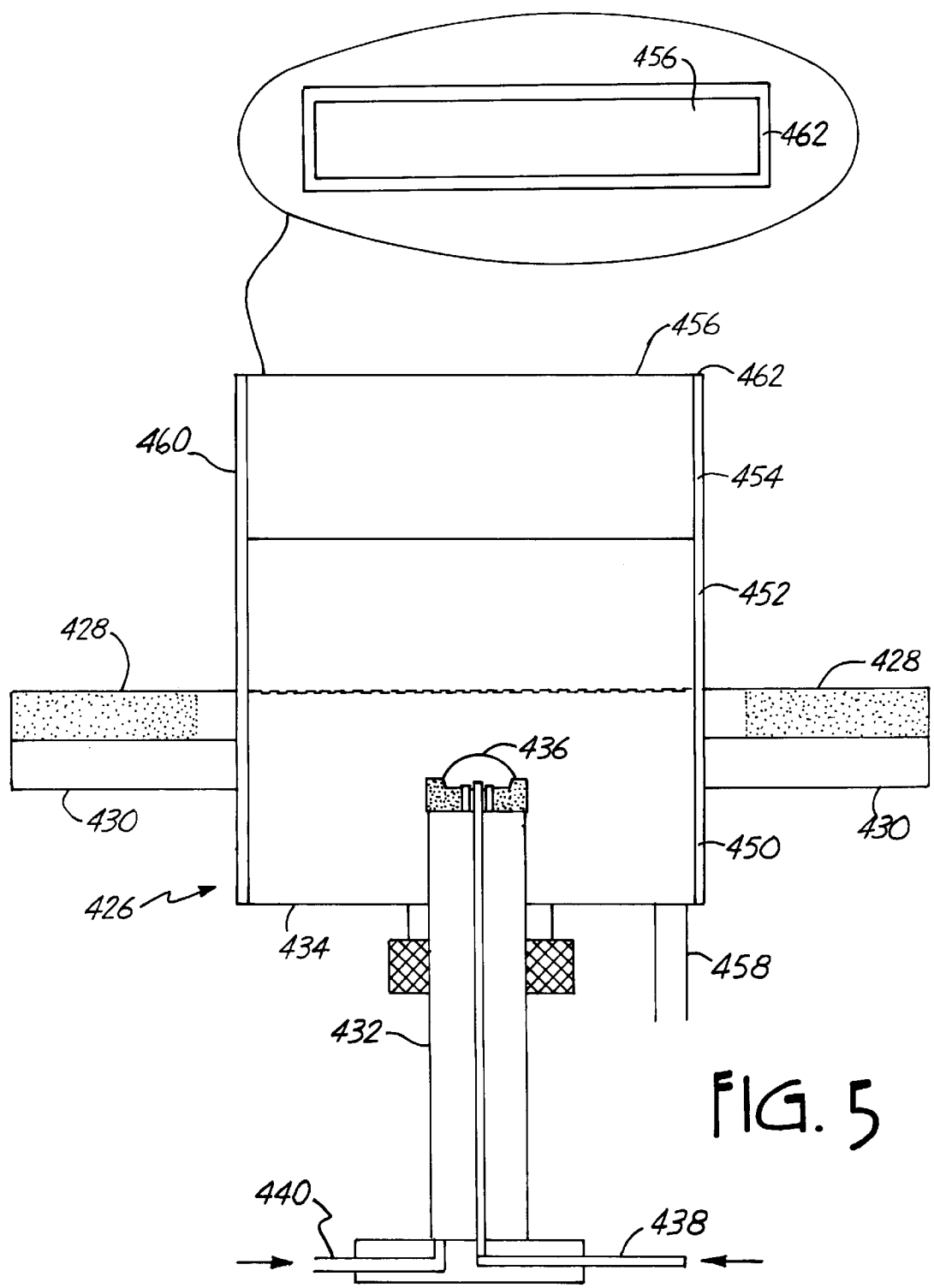
FIG. 5 is a sectional view of the inlet nozzle of the alternative laser pyrolysis apparatus of FIG. 4, the cross section being taken along the length of the nozzle through its center.

This example describes the production of lithium cobalt oxide nanoparticles. Initially, the synthesis of lithium cobalt oxide precursor particles was performed by laser pyrolysis. Laser pyrolysis was carried out using a reaction chamber essentially as described above with respect to FIGS. 4–6.

Cobalt nitrate ($Co(NO_3)_2 \cdot 6H_2O$) (Alfa Aesar, Inc., Ward Hill, Mass.) precursor and lithium nitrate ($LiNO_3$) (Alfa Aesar, Inc.) precursor were dissolved in deionized water. Two different concentrations of solutions were used, as specified in Table 1. The aqueous metal precursor solutions were carried into the reaction chamber as an aerosol. $C_2H_4$ gas was used as a laser absorbing gas, and Argon was used as an inert gas. The reactant mixture containing cobalt nitrate, lithium nitrate, Ar, $O_2$ and $C_2H_4$ was introduced into the reactant nozzle for injection into the reaction chamber. Additional parameters of the laser pyrolysis synthesis relating to the particles of Example 1 are specified in Table 1.

TABLE 1

| | 1 | 2 |
|---|---|---|
| Crystalline Phases | cobalt, cobalt oxide (CoO), $Li_2CO_3$ | cobalt, cobalt oxide (CoO), $Li_2CO_3$ |
| Pressure (Torr) | 150 | 150 |
| Argon F.R.-Window (SLM) | 5 | 5 |
| Argon F.R.-Shielding (SLM) | 20 | 20 |
| Ethylene (SLM) | 4.75 | 4.75 |
| Carrier Gas (Argon) (SLM) | 11 | 11 |
| Oxygen (SLM) | 5.1 | 5.1 |
| Laser Input (Watts) | 1200 | 1200 |
| Laser Output (Watts) | 850 | 920 |
| Production Rate (g/hr) | 8.4 | 2.1 |
| Precursor | 1.49M cobalt nitrate, 1.93M lithium nitrate | 0.75M cobalt nitrate, 0.97M lithium nitrate | slm = standard liters per minute
Argon - Win. = argon flow through inlets 216, 218
Argon - Sld. = argon flow through annular channel 142.

Figure 11:
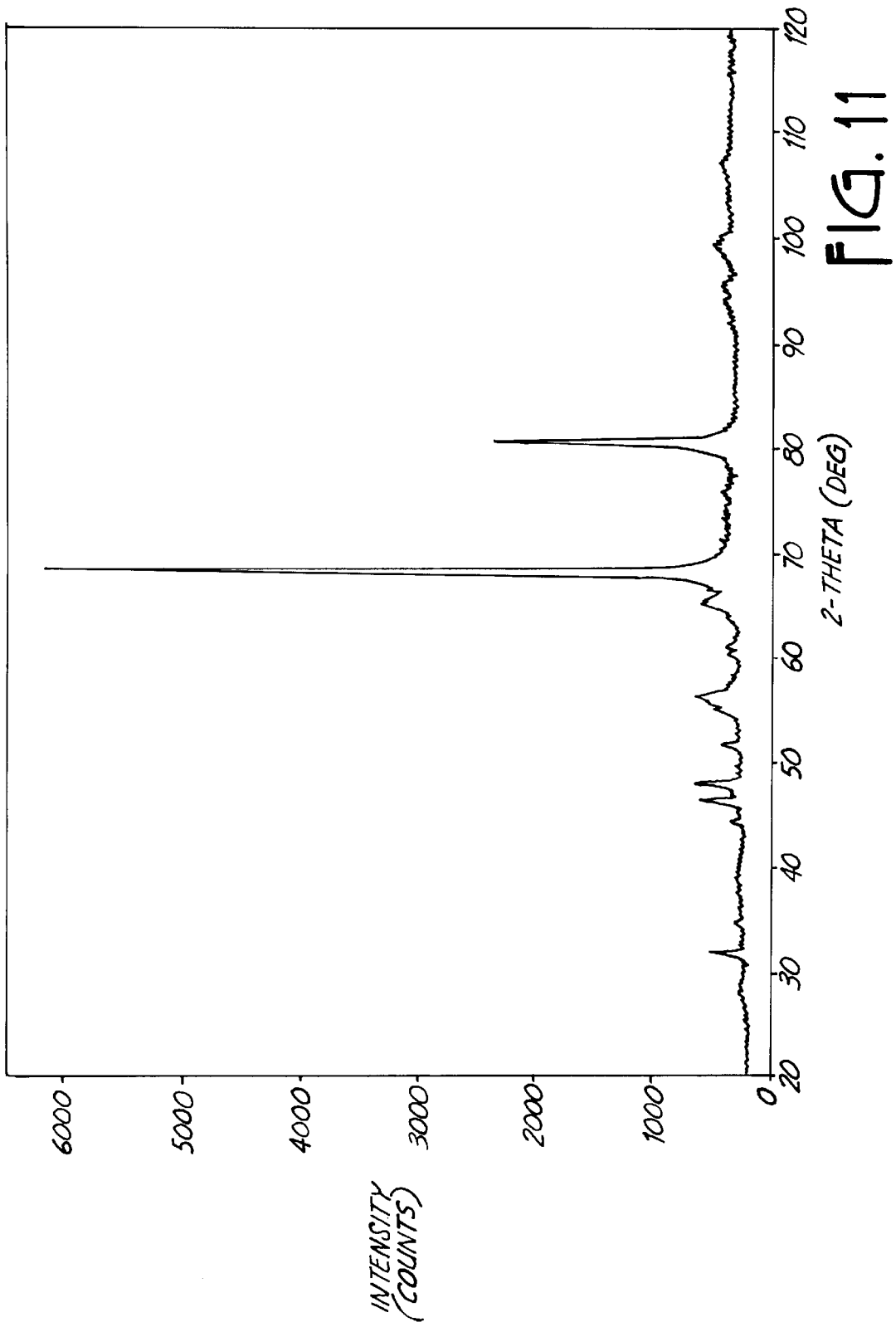
FIG. 11 is an x-ray diffractogram of lithium cobalt oxide precursor nanoparticles produced by laser pyrolysis with gaseous reactants according to the parameters specified in column 1 of Table 1.

To evaluate the atomic arrangement, the samples were examined by x-ray diffraction using the Cr(Kα) radiation line on a Rigaku Miniflex x-ray diffractometer. X-ray diffractograms for a sample produced under the conditions specified in the first column of Table 1 is shown in FIG. 11. Crystalline phases were identified that corresponded to cobalt metal, cobalt oxide (CoO) and lithium carbonate ($Li_2CO_3$). The precursor particles produced under the conditions in the second column of Table 1 had an x-ray diffractogram similar to the diffractogram shown in FIG. 11.

A sample of lithium cobalt oxide precursor nanoparticles produced by laser pyrolysis according to the conditions specified in the first column of Table 1 was heated in an oven under oxidizing conditions. The oven was essentially as described above with respect to FIG. 9. Between about 100 and about 700 mg of nanoparticles were placed in an open 1 cc boat within the quartz tube projecting through the oven. Air was flowed through a 3.0 inch diameter quartz tube at a flow rate of 450 sccm. The oven was heated to about 675° C. The particles were heated for about 5 hours. Similarly, a sample produced under the conditions in the second column of Table 1 were heated at 590° C. for five hours in air. When the samples were heated at temperatures greater than about 700° C., significant particle growth was observed. When the particles were heated at temperatures less than about 500° C. a low temperature phase of lithium cobalt oxide was formed that exhibited a lower specific energy over a four volt lithium battery discharge range.

Figure 12:
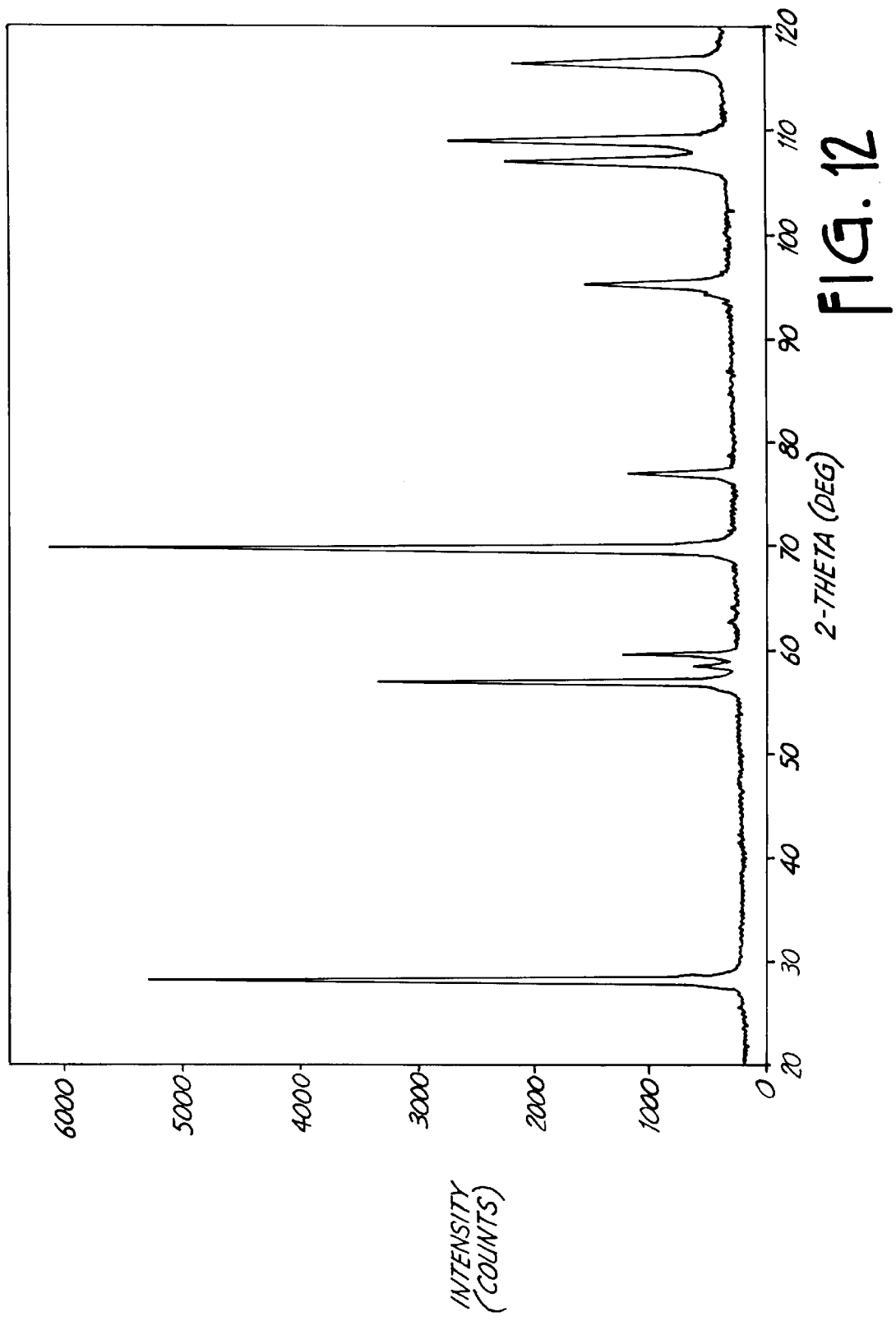
FIG. 12 is an x-ray diffractogram of crystalline lithium cobalt oxide nanoparticles produced by heat treating lithium cobalt oxide precursor nanoparticles.

The crystal structure of the resulting heat treated particles was determined by x-ray diffraction. The x-ray diffractogram for heated sample from the first column of Table 1 is shown in FIG. 12. The x-ray diffractogram shown in. FIG. 12 indicates that the collection of particles included crystals of $LiCoO_2$. $LiCoO_2$ is reported to have a rhombohedral crystal structure.

Figure 13:
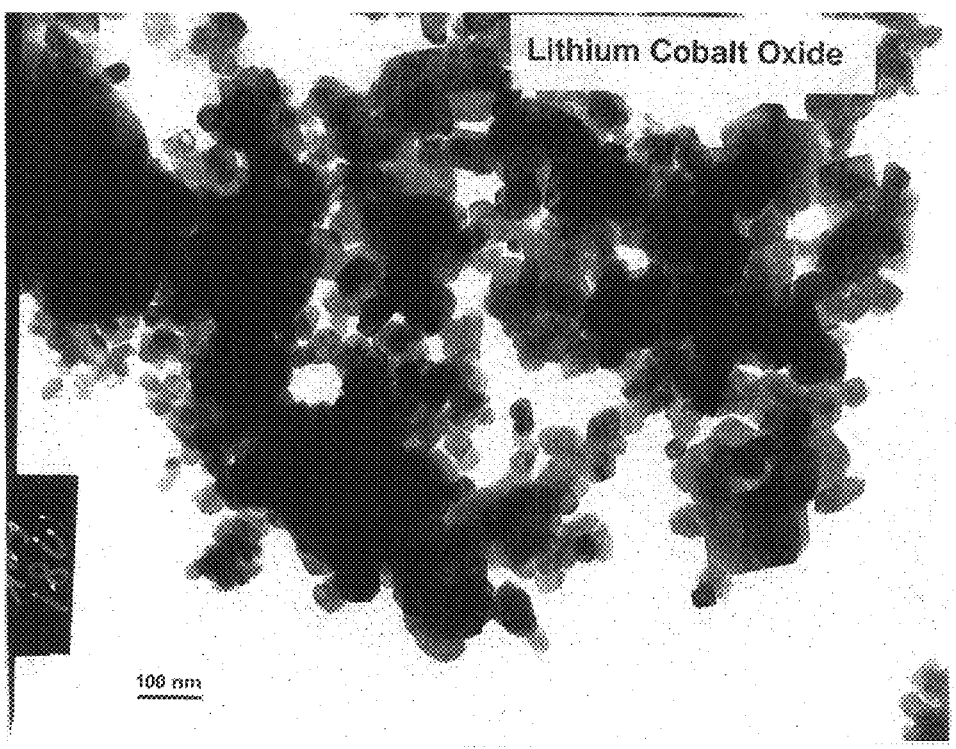
FIG. 13 is a transmission electron microscopy (TEM) micrograph of the crystalline lithium cobalt oxide nanoparticles.
Figure 14:
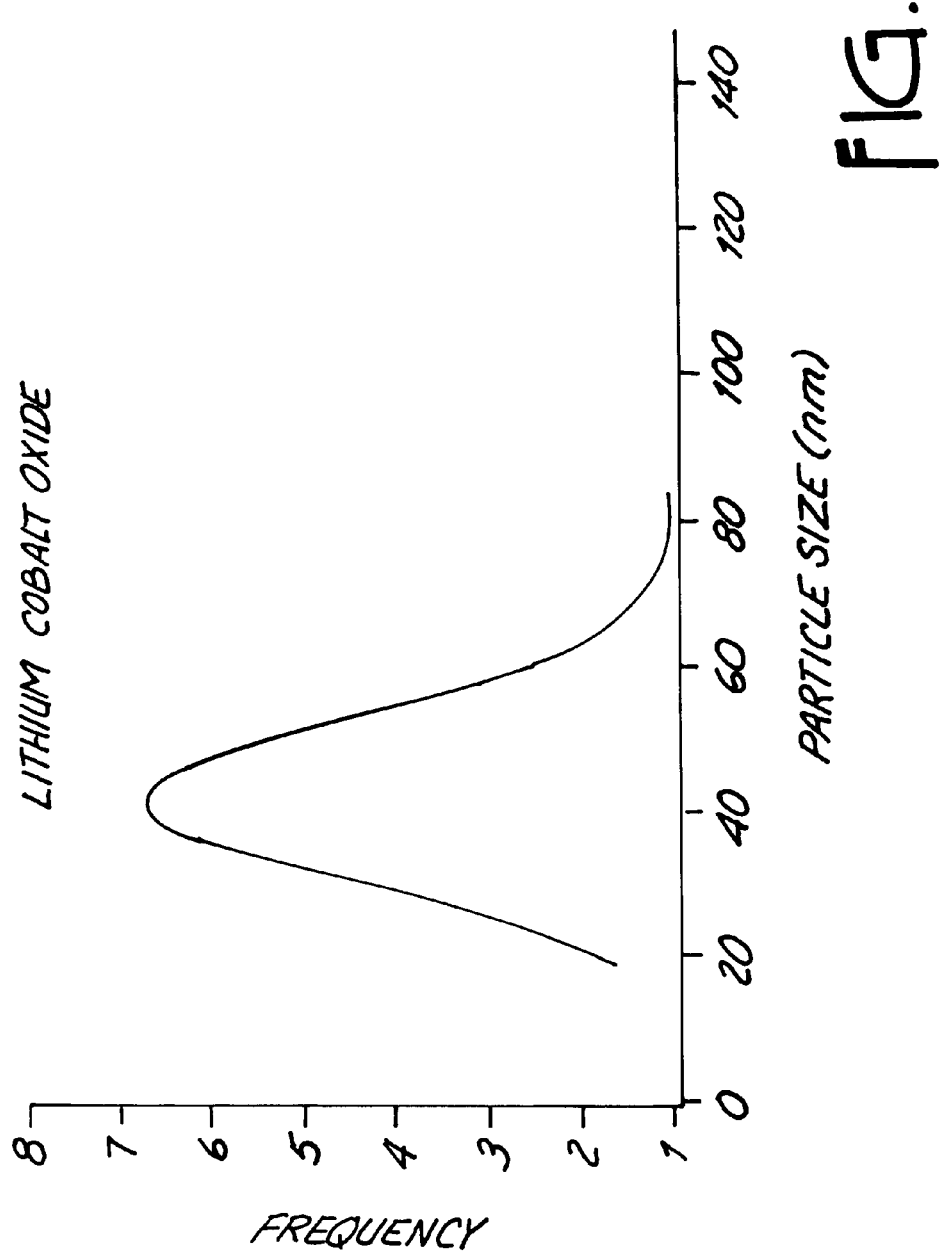
FIG. 14 is a particle size distribution produced from the micrograph of FIG. 13.

Transmission electron microscopy (TEM) was used to evaluate particle sizes and morphology of the heat treated samples. A TEM photograph of the lithium cobalt oxide particles produced following heat treatment of precursor particles formed under the conditions in the first column of Table 1 are shown in FIG. 13. An examination of a portion of the TEM micrograph yielded an average particle size of about 40 nm. The corresponding particle size distribution is shown in FIG. 14. The approximate size distribution was determined by manually measuring diameters of the particles distinctly visible in the micrograph of FIG. 13. Only those particles having clear particle boundaries were measured to avoid regions distorted or out of focus in the micrograph. Measurements so obtained should be more accurate and are not biased since a single view cannot show a clear view of all particles. It is significant that the particles span a rather narrow range of sizes. Some necking and agglomeration is observed in the TEM micrographs. The average dimension of nonspherical particles was used in plotting the particle size distribution.

Also, BET surface areas were measured for the two precursor particle samples produced by laser pyrolysis under the conditions specified in columns 1 and 2 of Table 1 and for portions of the samples following heat treatment. The BET surface area was determined with an $N_2$ gas absorbate. The BET surface area was measured with a Micromeritics Tristar 3000™ instrument. The results are shown in Table 2.

TABLE 2

| | 1 | 1H[1] | 2 | 2H[2] |
|---|---|---|---|---|
| Surface Area ($m^2$/gm) | 44 | 7 | 101 | 17 |

[1]Sample 1H is sample 1 of Table 1 following heat treatment as described above.
[2]Sample 2H is the sample 2 of Table 1 following heat treatment as described above.

The drop in BET surface area following heat treatment is consistent with grain growth and agglomeration due to the heating process.

Example 2

Lithium Nickel Oxide

This example describes the production of lithium nickel oxide nanoparticles. Initially, the synthesis of lithium nickel oxide precursor particles was performed by laser pyrolysis. Laser pyrolysis was performed using an apparatus essentially as described above with respect to FIGS. 4–6.

Nickel nitrate ($Ni(NO_3)_2 \cdot 6H_2O$) (Alfa Aesar, Inc., Ward Hill, Mass.) precursor and lithium nitrate ($LiNO_3$) (Alfa Aesar, Inc.) precursor were dissolved in deionized water with concentration as noted in Table 3. The aqueous metal precursor solutions were carried into the reaction chamber as an aerosol. $C_2H_4$ gas was used as a laser absorbing gas, and Argon was used as an inert gas. The reactant mixture containing nickel nitrate, lithium nitrate, Ar, $O_2$ and $C_2H_4$ was introduced into the reactant nozzle for injection into the reaction chamber. Additional parameters of the laser pyrolysis synthesis relating to lithium nickel oxide precursor particles are specified in Table 3.

TABLE 3

|  | 1 |
| --- | --- |
| Crystalline Phases | nickel, nickel oxide (NiO), $Li_2CO_3$, amorphous phases |
| Pressure (Torr) | 150 |
| Argon F.R.-Window (SLM) | 5 |
| Argon F.R.-Shielding (SLM) | 20 |
| Ethylene (SLM) | 4.75 |
| Carrier Gas (Argon) (SLM) | 12 |
| Oxygen (SLM) | 5.1 |
| Laser Input (Watts) | 1207 |
| Laser Output (Watts) | 1010 |
| Production Rate (g/hr) | 4.9 |
| Precursor | 1.54M nickel nitrate, 2.0M lithium nitrate | slm = standard liters per minute
Argon - Win. = argon flow through inlets 216, 218
Argon - Sld. = argon flow through annular channel 142.

Figure 15:
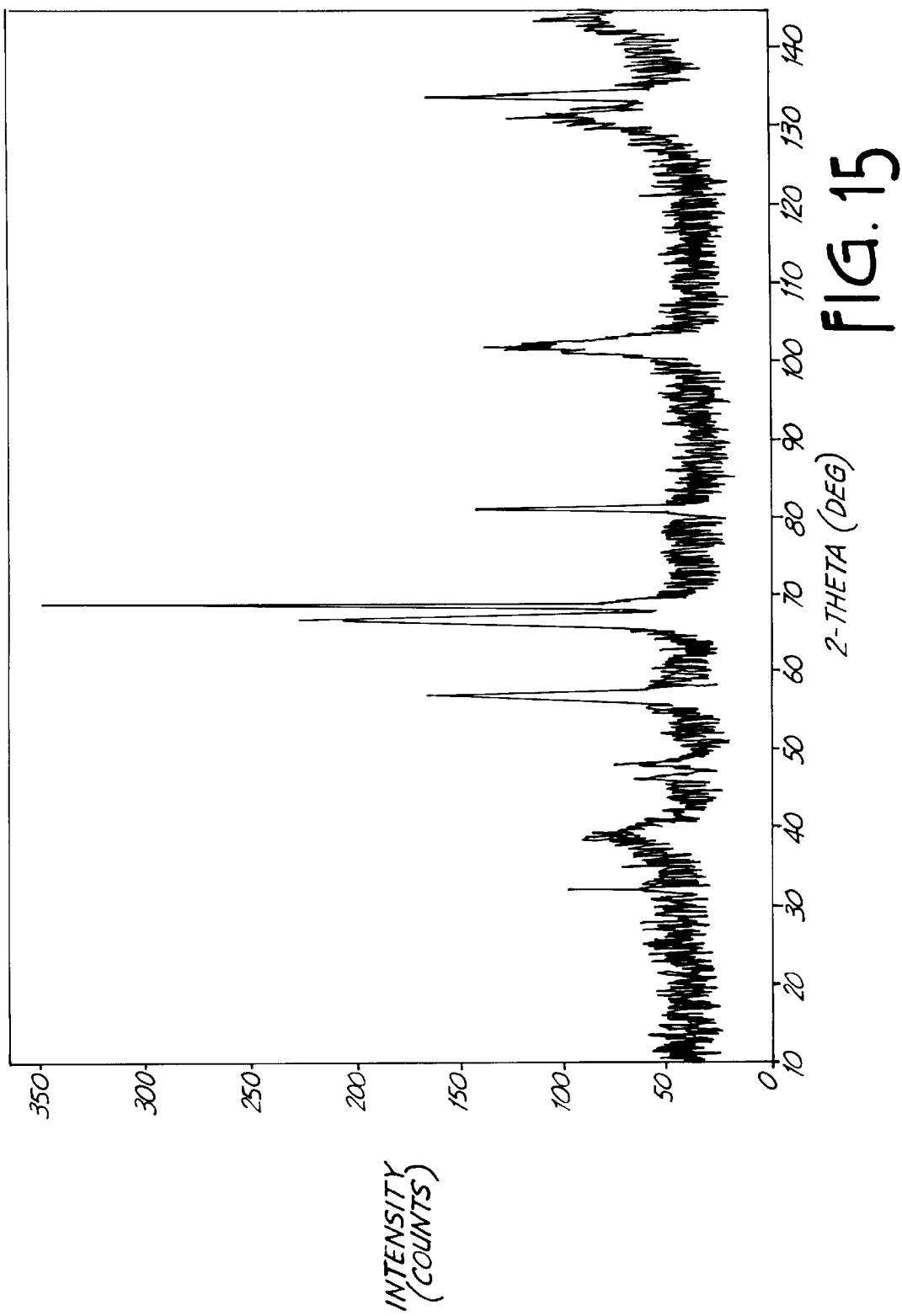
FIG. 15 is an x-ray diffractogram of lithium nickel oxide precursor nanoparticles produced by laser pyrolysis according to parameters specified in Table 3.

To evaluate the atomic arrangement, the samples were examined by x-ray diffraction using the Cr(Kα) radiation line on a Rigaku Miniflex™ x-ray diffractometer. X-ray diffractograms for a sample produced under the conditions specified in Table 3 is shown in FIG. 15. Crystalline phases were identified that corresponded to nickel metal, nickel oxide (NiO) and lithium carbonate ($Li_2CO_3$)

A sample of lithium nickel oxide precursor nanoparticles produced by laser pyrolysis according to the conditions specified in Table 3 was heated in an oven under oxidizing conditions. The oven was essentially as described above with respect to FIG. 9. Between about 100 and about 300 mg of nanoparticles were placed in an open 1 cc boat within the quartz tube projecting through the oven. Air was flowed through a 1.0 inch diameter quartz tube at a flow rate of 200 cc/min. The oven was heated in air to about 400° C. for about 1 hour and then to about 750° C. for about 3 hours.

Figure 16:
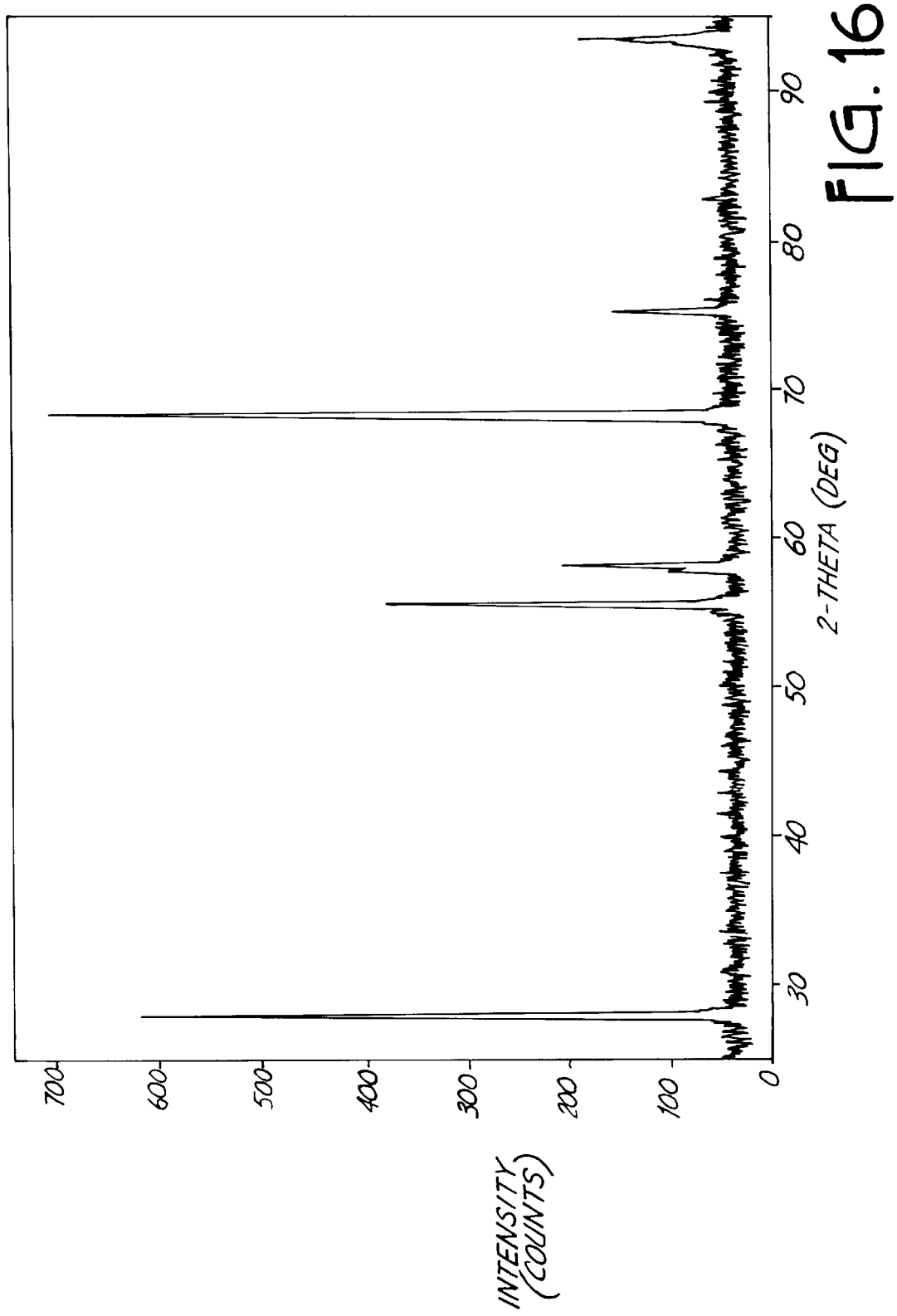
FIG. 16 is an x-ray diffractogram of crystalline lithium nickel oxide nanoparticles produced by heat treating lithium nickel oxide precursor nanoparticles.

The crystal structure of the resulting heat treated particles were determined by x-ray diffraction. The x-ray diffractogram for the heated sample with precursors produced under the conditions listed in Table 3 is shown in FIG. 16. The x-ray diffractogram shown in FIG. 16 indicates that the collection of particles involved crystals of $LiNiO_2$.

Example 3

Lithium Nickel Cobalt Oxide

This example describes the production of lithium nickel cobalt oxide nanoparticles. Initially, the synthesis of lithium nickel cobalt oxide precursor particles was performed by laser pyrolysis. The laser pyrolysis was performed in a reaction chamber essentially as described above with respect to FIGS. 4–6.

Nickel nitrate ($Ni(NO_3)_2 \cdot 6H_2O$) (Alfa Aesar) precursor, cobalt nitrate ($Co(NO_3)_2 \cdot 6H_2O$) (Alfa Aesar) precursor and lithium nitrate ($LiNO_3$) (Alfa Aesar) precursor were dissolved in deionized water at concentrations as noted in Table 4. The aqueous metal precursor solutions were carried into the reaction chamber as an aerosol. $C_2H_4$ gas was used as a laser absorbing gas, and Argon was used as an inert gas. The reactant mixture containing nickel nitrate, cobalt nitrate, lithium nitrate, Ar, $O_2$ and $C_2H_4$ was introduced into the reactant nozzle for injection into the reaction chamber. Additional parameters of the laser pyrolysis synthesis for producing lithium nickel cobalt oxide precursor particles are specified in Table 4.

TABLE 4

|  | 1 |
| --- | --- |
| Crystalline Phases | nickel, nickel oxide (NiO), $LiCO_3$, amorphous phases |
| Pressure (Torr) | 150 |
| Argon F.R.-Window (SLM) | 5 |
| Argon F.R.-Shielding (SLM) | 20 |
| Ethylene (SLM) | 4.75 |
| Carrier Gas (Argon) (SLM) | 12 |
| Oxygen (SLM) | 5.1 |
| Laser Input (Watts) | 1207 |
| Laser Output (Watts) | 1030 |
| Production Rate (g/hr) | 3.64 |
| Precursor | 1.74M nickel nitrate, 0.35 M cobalt nitrate, 2.25M lithium nitrate | slm = standard liters per minute
Argon - Win. = argon flow through inlets 216, 218
Argon - Sld. = argon flow through annular channel 142.

Figure 17:
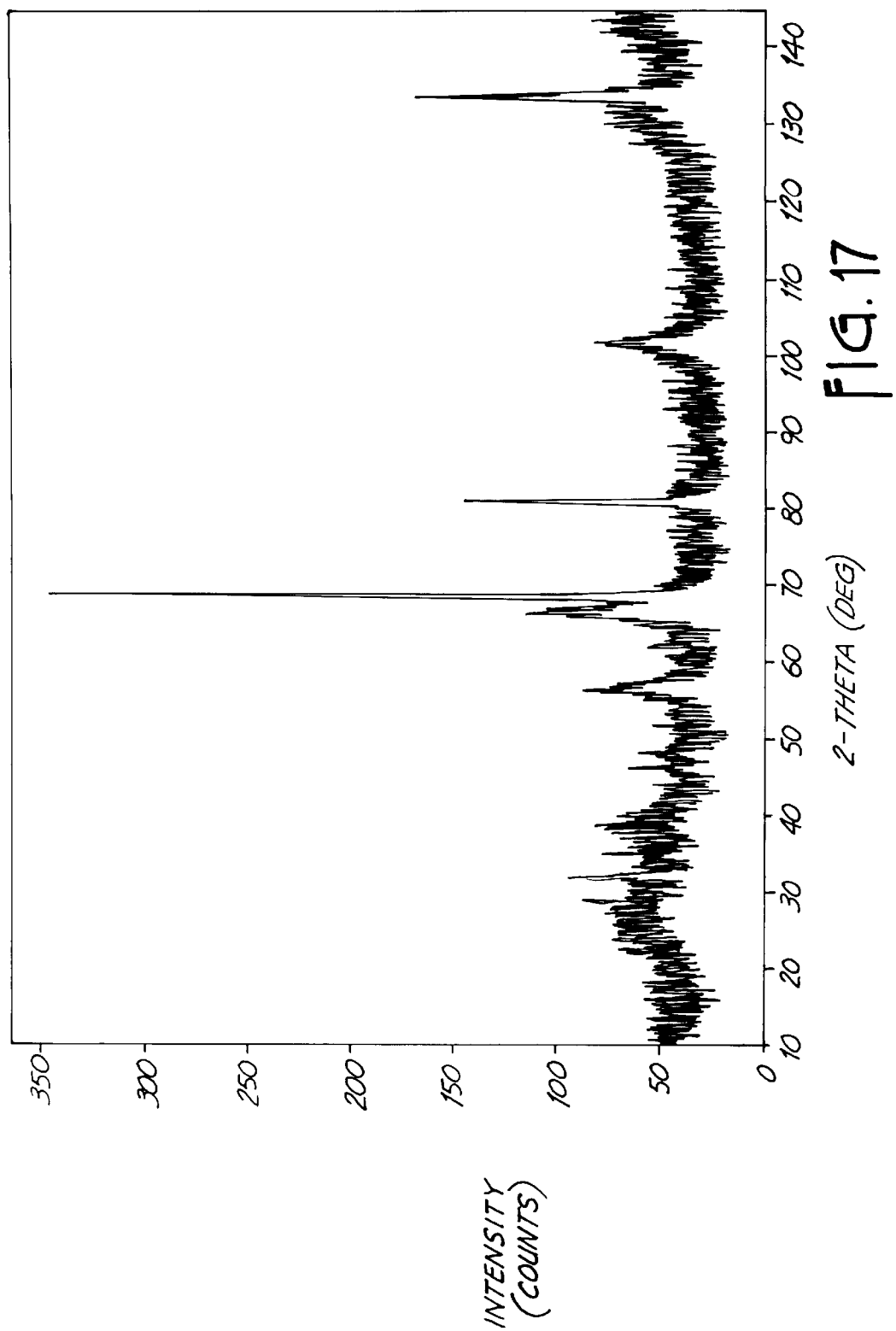
FIG. 17 is an x-ray diffractogram of lithium nickel cobalt oxide precursor nanoparticles produced by laser pyrolysis according to parameters specified in Table 4.

To evaluate the atomic arrangement, the samples were examined by x-ray diffraction using the Cr(Kα) radiation line on a Rigaku Miniflex™ x-ray diffractometer. X-ray diffractograms for a sample produced under the conditions specified in Table 4 is shown in FIG. 17. Crystalline phases were identified that corresponded to nickel metal, nickel oxide (NiO) and lithium carbonate ($Li_2CO_3$). Some amorphous phase material may also be present.

A sample of lithium nickel cobalt oxide precursor nanoparticles produced by laser pyrolysis according to the conditions specified in Table 4 was heated in an oven under oxidizing conditions. The oven was essentially as described above with respect to FIG. 9. Between about 100 and about 700 mg of nanoparticles were placed in a boat within the quartz tube projecting through the oven. Air was flowed through a 1.0 inch diameter quartz tube at a flow rate of 200 cc/min. The oven was heated in air to about 400° C. for about 1 hour and then to about 675° C. for about 3 hours.

Figure 18:
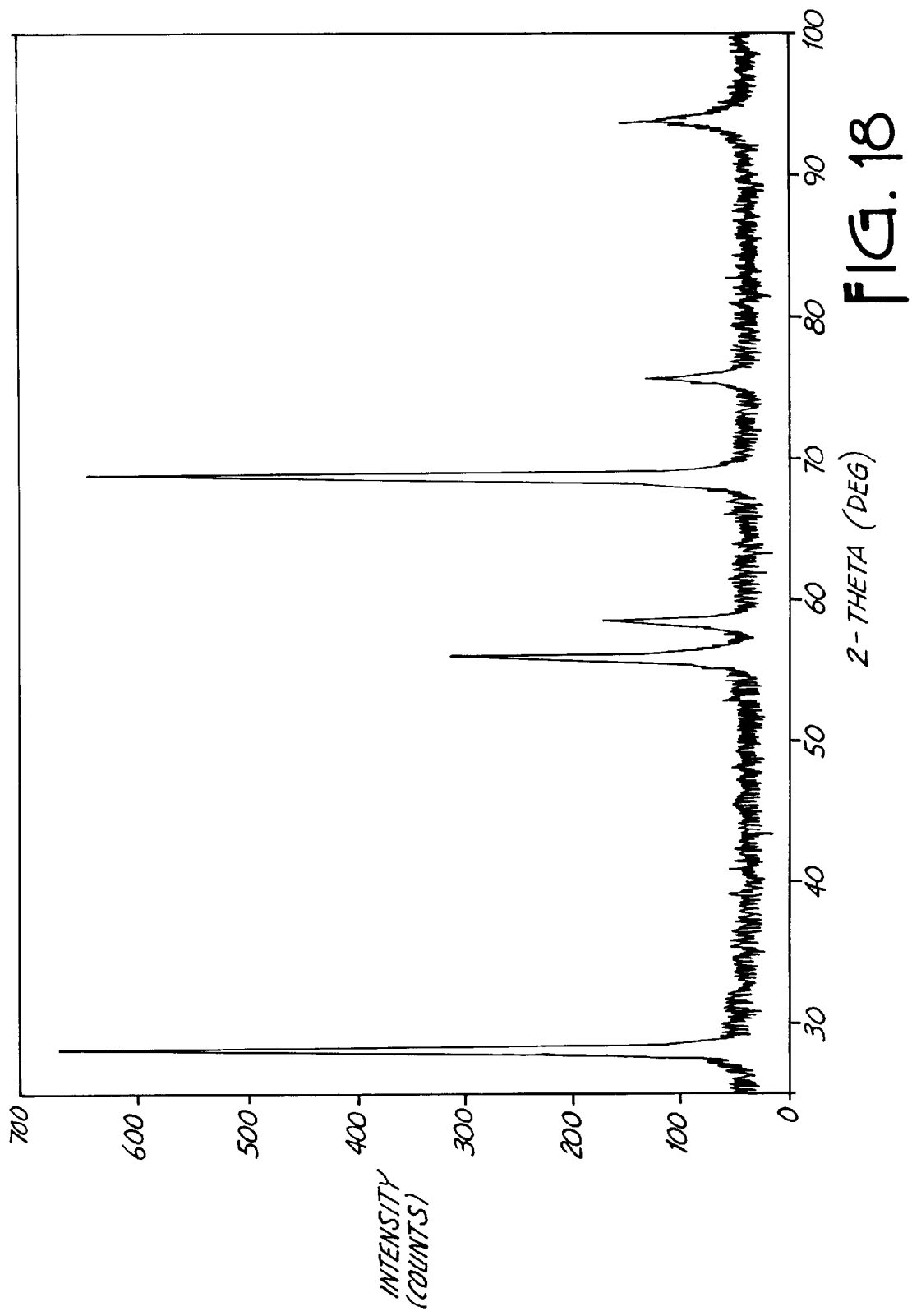
FIG. 18 is an x-ray diffractogram of crystalline lithium nickel cobalt oxide nanoparticles produced by heat treating lithium nickel cobalt oxide precursor nanoparticles.

The crystal structure of the resulting heat treated particles were determined by x-ray diffraction. The x-ray diffractogram for heated sample with precursors produced under the conditions listed in Table 4 is shown in FIG. 18. The x-ray diffractogram shown in FIG. 18 indicates that the collection of particles included crystals of lithium nickel cobalt oxide. The precursors were introduced at a concentration to target a composition of $LiNi_{0.8}Co_{0.2}O_2$.

Example 4

Lithium Titanium Oxide Nanoparticles

The production of nanoparticles of lithium titanium oxide ($Li_4Ti_5O_{12}$) is described in this example. The lithium titanium oxide nanoparticles were produced in a two step process. In the first step, titanium oxide nanoparticles were produced by laser pyrolysis. In the second step, a mixture of titanium oxide nanoparticles and lithium hydroxide were heated.

The titanium oxide particles were produced using essentially a laser pyrolysis apparatus shown in FIG. 1 of U.S. Pat. No. 5,938,979 to Kambe et al., entitled "Electromagnetic Shielding," incorporated herein by reference. Titanium tetrachloride (Strem Chemical, Inc., Newburyport, Mass.) precursor vapor was carried into the reaction chamber by bubbling Ar gas through $TiCl_4$ liquid in a container at room temperature. $C_2H_4$ gas was used as a laser absorbing gas, and argon was used as an inert gas. The reaction gas mixture containing $TiCl_4$, Ar, $O_2$ and $C_2H_4$ was introduced into the reactant gas nozzle for injection into the reaction chamber. The reactant gas nozzle had an opening with dimensions of ⅝ in×⅛ in. The production rate of titanium dioxide particles was typically about 4 g/hr. Additional parameters of the laser pyrolysis synthesis relating to the titanium oxide particles are specified in Table 5.

TABLE 5

| | 1 |
|---|---|
| Crystalline Phases | Anatase & Rutile |
| Pressure (Torr) | 320 |
| Argon F.R.- Window (SCCM) | 700 |
| Argon F.R.- Shielding (SLM) | 7.92 |
| Ethylene (SLM) | 1.34 |
| Carrier Gas (Argon) (SCCM) | 714 |
| Oxygen (SCCM) | 550 |
| Laser Output (Watts) | 450 |
| Nozzle Size | 5/8 in × 1/8 in | sccm = standard cubic centimeters per minute
slm = standard liters per minute
Argon - Win. = argon flow through inlets 216, 218
Argon - Sld. = argon flow through annular channel 142.

Figure 19:
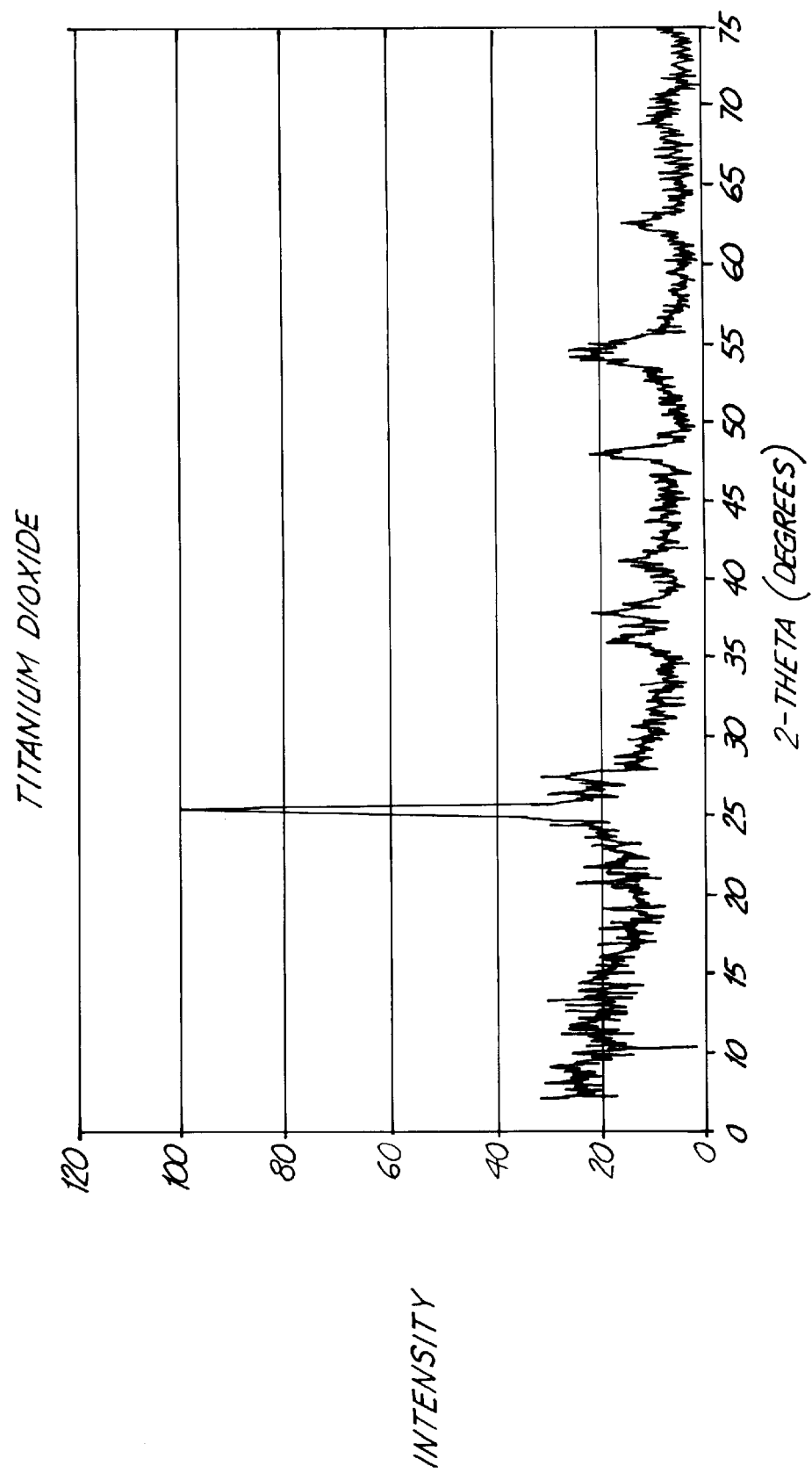
FIG. 19 is an x-ray diffractogram of titanium dioxide nanoparticles.

To evaluate the atomic arrangement, the samples were examined by x-ray diffraction using the Cr(Kα) radiation line on a Rigaku Miniflex™ x-ray diffractometer. X-ray diffractograms for a sample produced under the conditions specified in Table 5 is shown in FIG. 19. The titanium dioxide particles had a crystal structure indicating mixed phases of anatase titanium dioxide and a small portion of rutile titanium dioxide. The diffractogram has a broad peak at about 23° and at low scattering angles indicative of amorphous carbon. The amorphous carbon coating can be removed upon subsequent heating.

Figure 20:
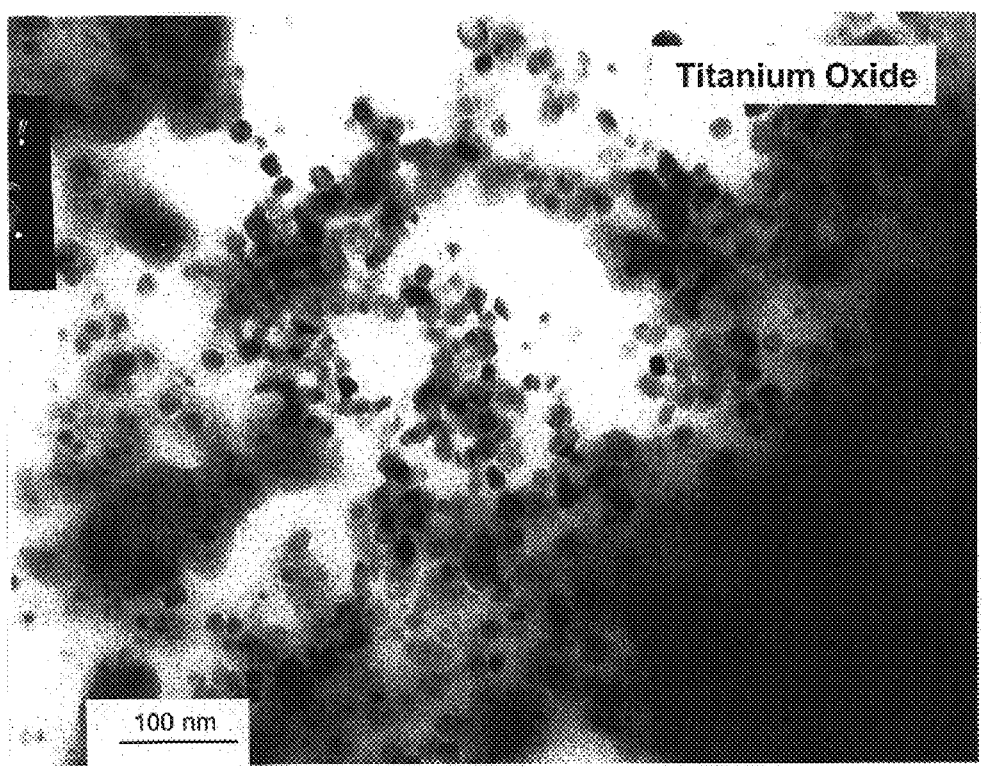
FIG. 20 is a transmission electron micrograph of titanium dioxide nanoparticles.

Transmission electron microscopy (TEM) was used to determine particle sizes and morphology. A TEM micrograph for the particles produced under the conditions of Table 5 is displayed in FIG. 20. The particles had facets corresponding to the crystal lattice of the titanium oxide.

An elemental analysis of the particles was performed. The particles included 55.18 percent by weight carbon and 19.13 percent by weight titanium. Chlorine contamination was found to be 0.42 percent by weight. Oxygen was not directly measured but presumably accounted for most of the remaining weight. The elemental analysis was performed by Desert Analytics, Tucson, Ariz.

To produce the lithium titanium oxide particles, 3.67 g LiOH·H₂O (Alfa Aesar, Inc., Ward Hill, Mass.) and 8.70 g $TiO_2$ nanoparticles (as described above) were mixed together using 22.9 g diglyme as a dispersant. Other dispersants can be used as long as they do not dissolve either reactant. The mixture was combined with 3 mm yttria-stabilized zirconia grinding media in a polypropylene bottle (Union Process, Akron, Ohio). The slurry with the grinding media was mixed for two hours in a shaker mill (SPEX Certiprep, Inc., Metuchen, N.J.).

After mixing the slurry was poured through a sieve to remove the grinding media. The grinding media was rinsed with additional diglyme to remove additional material from the grinding media. Following removal of the grinding media, the slurry was vacuum filtered to remove the solvent and to collect the power on filter paper. The powder was transferred from the filter paper to a glass petri dish.

To remove the remaining solvent, the material was heated at 160° C. for 10 hours under vacuum. The solvent was collected in a trap. To perform the conversion of the material to lithium titanium oxide, the dried material was heated in an alumina boat within a one inch tube furnace, as shown schematically in FIG. 9. $O_2$ is flowed through the tube at a rate of 40 cc/min. The heat treatment was continued for 20 hours at 800° C. For comparison commercial $TiO_2$ was processed into $Li_4Ti_4O_{12}$ in the same way.

Figure 21:
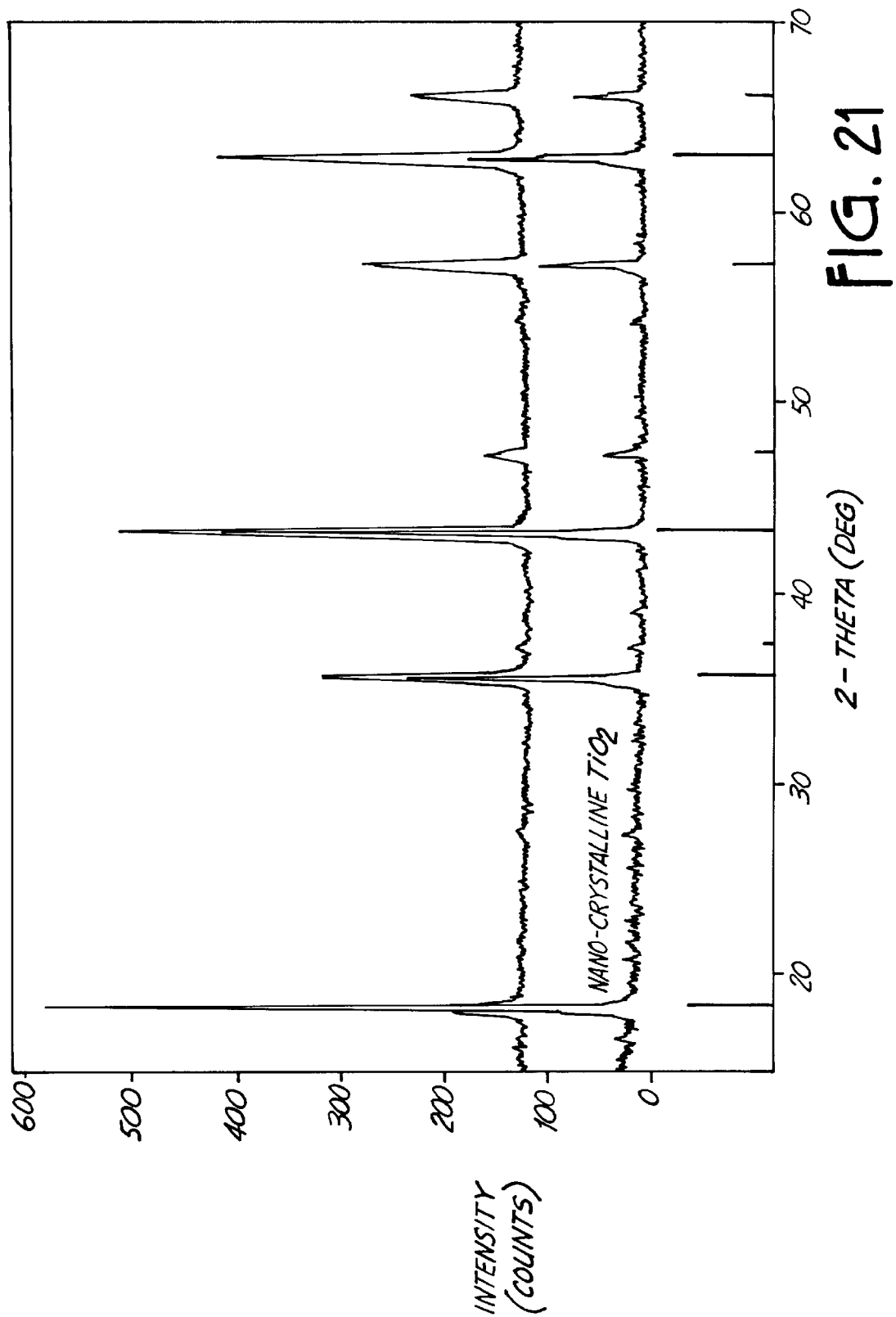
FIG. 21 is a plot of x-ray diffractograms for lithium titanium oxides produced from commercial titanium dioxide (upper curve) and nanoparticles of titanium dioxide (lower curve).

The crystal structures of the resulting heat treated particles were determined by x-ray diffraction using the Cr(Kα) radiation line on a Rigaku Miniflex™ x-ray diffractometer. The x-ray diffractograms for the heated samples are shown in FIG. 21. The upper curve is the diffractogram obtained from the lithium titanium oxide formed from commercial $TiO_2$, and the lower curve is the diffractogram obtained from the lithium titanium oxide formed from nanoparticulate $TiO_2$. The line plot at the bottom of FIG. 21 indicates the known positions and relative intensities of an x-ray diffractogram for $Li_4Ti_5O_{12}$. From a review of the x-ray diffractograms, the synthesized lithium titanium oxide particles had a stoichiometry corresponding to $Li_4Ti_5O_{12}$.

Figure 22:
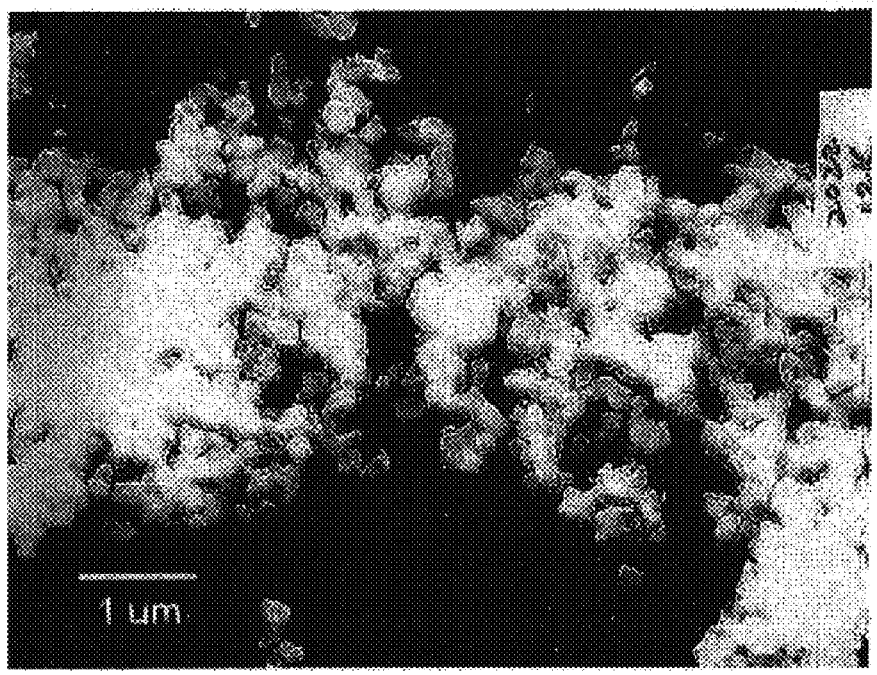
FIG. 22 is a transmission electron micrograph of nanoparticles of lithium titanium oxide with a stoichiometry of $Li_4Ti_5O_{12}$.

A transmission electron micrograph (TEM), shown in FIG. 22, was obtained for the lithium titanium oxide nanoparticles. From the TEM photo, the particles had an average particle diameter of about 200 nm. TEM analysis of the $TiO_2$ nanoparticles indicated a bimodal distribution of particle sizes with average particles sizes of about 15 nm and about 100 nm. A bimodal distribution is generally indicative of a blend of two types of particles with different compositions. It was not know if the distribution of smaller nanoparticles corresponded to carbon particles or titanium oxide particles.

BATTERY TESTING EXAMPLES

Example 5

Discharge Properties of Crystalline Lithium Cobalt Oxide Nanoparticles

The properties of crystalline lithium cobalt oxide nanoparticles produced by heat treatment of nanoparticle precursors synthesized by laser pyrolysis was examined using a beaker cell test. The lithium cobalt oxide nanoparticles were produced by a heat treatment as described in Example 1 using the precursors synthesized under the conditions specified in the first column of Table 1.

To produce the batteries for beaker cell testing, the lithium cobalt oxide (LCO) powders were mixed with a conductive acetylene black powder (Catalog number 55, Chevron Corp.) at a ratio of 60:30. The powder mixture was ground with a mortar and palette to thoroughly mix the powders.

A few drops of polyvinylidene fluoride (PVDF) solution were added to the homogeneous powder mixture. The 10 percent PVDF solution included PVDF (type 714, Elf Atochem North America, Inc., Philadelphia, Pa.) dissolved in 1-methyl-2-pyrroidinone (Aldrich Chemical Co., Milwaukee, Wis.). The final ratio of LCO:AB:PVDF was 60:30:10. The resulting slurry was spread onto a preweighed aluminum metal mesh. The mesh with the slurry was baked in a vacuum oven overnight at 120° C. to remove the solvent and residual moisture. After removal from the oven, the electrodes were immediately placed in a glove box (Vacuum Atmosphere Co., Hawthorne, Calif.) under an argon atmosphere and weighted again.

Figure 23:
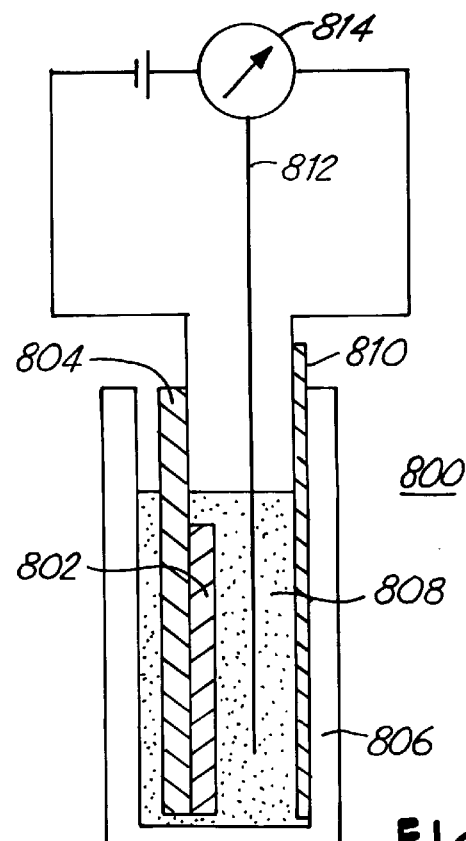
FIG. 23 is a schematic, perspective view of the three electrode beaker cell set-up used to test the lithium intercalation properties of crystalline lithium cobalt oxide nanoparticles.

All discharge/charge experiments were conducted in the glove box. The water and oxygen concentrations in the glove box were measured to be less than 1 ppm and 1.5 ppm, respectively. In a first set of experiments, the samples were tested in a three electrode configuration, as shown in FIG. 23. In the battery test set up 800, cathode 802 on aluminum mesh 804 is place in container 806. Container 806 holds liquid electrolyte 808. Counter electrode 810 and reference electrode 812 are also placed into container 806. Lithium metal was used as both counter electrode and reference electrode. The electrodes are connected to a battery testing system 814.

No separator is needed for this testing configuration since the electrodes are physically separated. Alternatively, the liquid electrolyte can be viewed as the separator. The liquid electrolyte (from Merck & Co., Inc.) was 1M $LiClO_4$ in propylene carbonate.

Charge and discharge experiments were conducted at an approximately constant current equivalent to about 5 mA per gram of oxide within the electrode. Each electrode contained about 10 mg of nanoparticles. Thus, the currents were about 0.05 mA. If the material were pure lithium cobalt oxide, this charge/discharge rate corresponds to a rate of C/30 (i.e., a rate such that the cathode would be fully discharged in 30 hours). The cells were initially charged from their open-circuit voltage up to 4.3 volts and then discharged down to 2.0 volts.

The measurements were controlled by an Arbin Battery Testing System, Model BT4023, from Arbin Instruments, College Station, Tex. The charging/discharging profiles were recorded, and the specific capacity was obtained. The specific capacity was evaluated as the discharge capacity divided by the mass of the active material. Also, the differential capacity ($\delta x/\delta V$) was determined by taking the derivative of the discharge capacity with respect to voltage. Therefore, the differential capacity is the inverse slope of the charge and discharge profile with respect to voltage. Peaks in the plot of differential capacity versus voltage indicate voltages where lithium inserts into the host material. In a lithium metal cell, the cell voltage is approximately proportional to the chemical potential of $Li^+$ in the host material. Therefore, the differential capacity can be used to characterize and/or identify the material and its structure.

Figure 24:
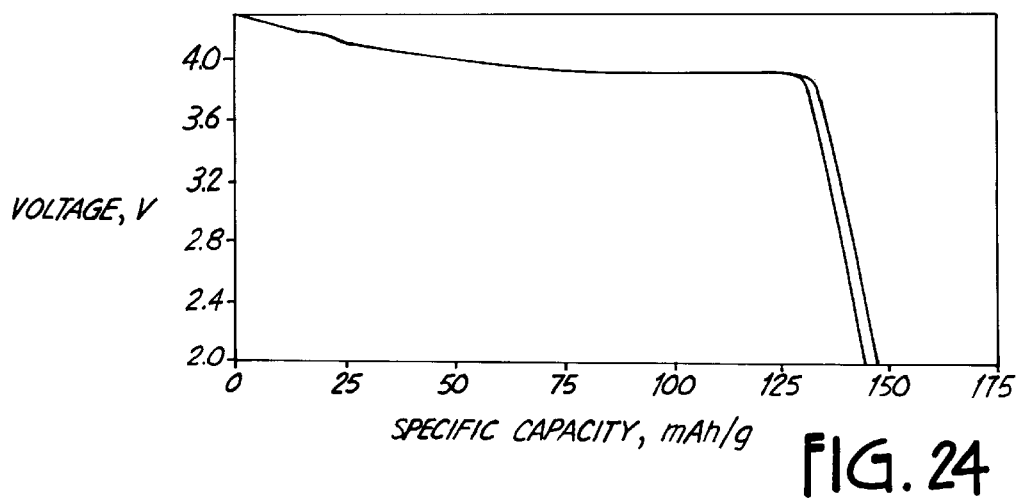
FIG. 24 is a plot of voltage as a function of specific capacity for the crystalline lithium cobalt nanoparticles over the first discharge cycle.
Figure 25:
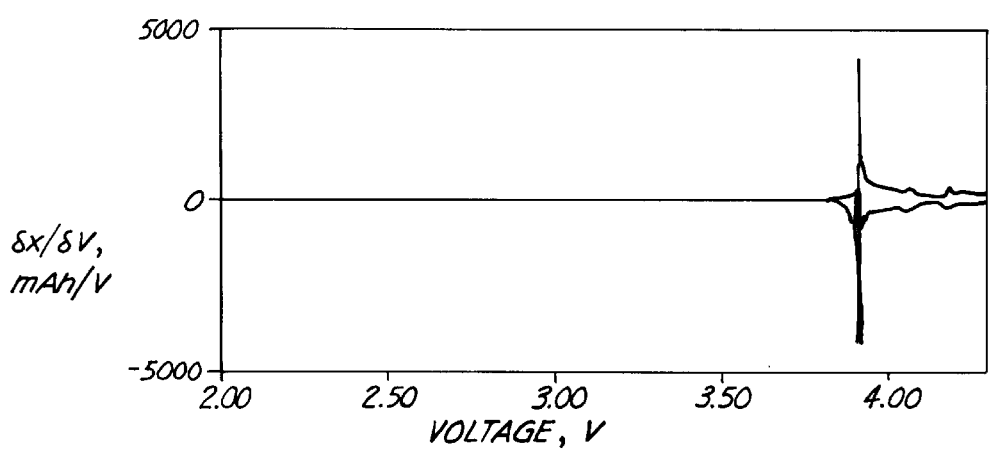
FIG. 25 is a plot of differential capacity as a function of voltage.

A discharge curve is plotted in FIG. 24 for two comparably prepared samples. The lithium cobalt oxide nanoparticles displayed a discharge capacity of about 145 mAh/gm. The differential capacity of the nanoparticles is plotted in FIG. 25 over a charging cycle and a discharging cycle. The shape of the curves are characteristic of the material, i.e., lithium cobalt oxide, and provide information about the lithium intercalation into the lattice.

Example 6

Cycling Properties of Lithium Cobalt Oxide Nanoparticles

In this example the battery cycling properties of the crystalline nanoparticles of lithium cobalt oxide were evaluated. The lithium cobalt oxide nanoparticles were produced by a heat treatment as described in Example 1 using the precursors synthesized under the conditions specified in the first column of Table 1.

To prepare the samples, the lithium cobalt oxide powders (LCO) were combined with graphite powder (KS-4, Timcal, Westlake, Ohio) with an average particle size of about 4 microns and carbon black powder (BP2000, Timcal, Westlake, Ohio) with an average particle size of about 12 nm, as conductive diluents. The dry powders were blended with a mortar and pestle with a 12% by weight dispersion of poly(vinydene fluoride) (PVdF) (Type 301F, Elf Atochem) in n-methyl-pyrrolidinone solvent. The PVdF serves as a binder. The solids in the resultant formulation was 78% by weight lithium cobalt oxide, 10% by weight carbon (about equal amounts of graphite and carbon black) and 12% by weight PVdF. The dispersion was mixed well and coated at a thickness of 200 microns onto an aluminum foil.

An approximately two-square centimeter disk was cut from the coated foil sheet, dried and pressed at 40,000 to 50,000 pounds over the two square centimeters to densify the coating. The compressed disk was vacuum dried and weighed. After drying, the disk had a thickness of about 19 microns and a density of approximately 3.1 g/cc.

Figure 26:
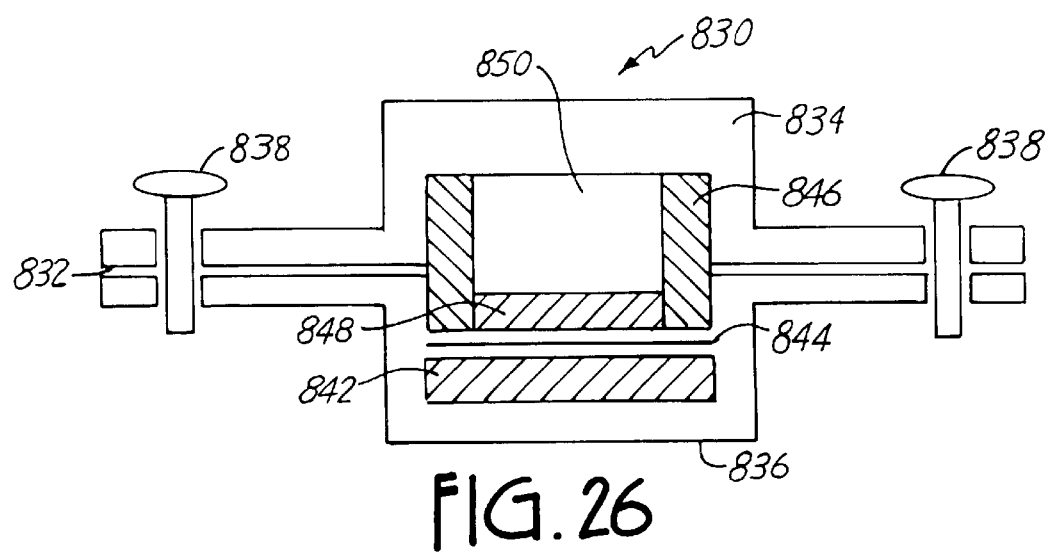
FIG. 26 is a sectional view of a two electrode test cell, the cross section being taken through one set of screws holding the housing together.

The samples were tested in an cell 830 with an airtight two-electrode configuration shown in FIG. 26. The casing 832 for the sample battery was obtained from Hohsen Co., Osaka, Japan. The casing included a top portion 834 and a bottom portion 836, which are secured with four screws 838. The two other screws not shown in FIG. 26 are behind the two screws shown. Lithium metal (Alfa/Aesar, Ward Hill, Mass.) was used as a negative electrode 842. Negative electrode 842 was placed within the bottom portion 836. A separator 844, Celgard® 2400 (Hoechst Celanese, Charlotte, N.C.), was placed above the lithium metal. A Teflon® ring 846 was placed above separator 844. A positive electrode 848 was placed mesh side up within Teflon® ring 846. An aluminum pellet 850 was placed above positive electrode 848, and electrolyte was added. The electrolyte from EM Industries (Hawthorne, N.Y.) was 1M $LiPF_6$ in 1:1 ethylene carbonate/dimethyl carbonate. A Teflon® o-ring is located between top portion 834 and bottom portion 836 to electrically insulate the two electrodes. Similarly, screws 838 are placed within a Teflon® sleeve to electrically insulate screws 838 from top portion 834 and bottom portion 836. Electrical contact between the battery tester and cell 830 is made by way of top portion 834 and bottom portion 836.

The samples were tested with a discharge/charge rate at a constant current of 0.5 mA/cm$^2$, and cycled between 3.3V to 4.25V at 25° C. The measurements were controlled by an Arbin Battery Testing System, Model BT4023, from Arbin Instruments, College Station, Tex. The charging/discharging profiles were recorded, and the discharge capacity of the active material was obtained.

The energy density is evaluated by the integral over the discharge time of the voltage multiplied by the current divided by the mass of the active material. The current during testing was 1 mA, corresponding to a current density of 0.5 mA/cm². The active material mass ranged from about 30 to about 50 mg.

The specific capacity as a function of discharge cycle is plotted in FIG. 27. The specific capacity and cycling properties are comparable to values obtained with commercially available lithium cobalt oxide. Only 12% fading was observed after 65 cycles even against lithium anodes, which are not the optimal material -for obtaining good cycling properties.

Example 7

Beaker Cell Testing of Lithium Nickel Cobalt Oxide

The properties of crystalline lithium nickel cobalt oxide ($LiNi_{0.8}Co0.2O_2$) nanoparticles produced by heat treatment of nanoparticle precursors synthesized by laser pyrolysis was examined using a beaker cell test. The lithium nickel cobalt oxide nanoparticles were produced by a heat treatment as described in Example 3 using the precursors synthesized under the conditions specified in Table 4.

The lithium nickel cobalt oxide electrodes for beaker cell testing were produced, as described above in Example 5. All discharge/charge experiments were conducted in a glove box, as described in Example 5. The samples were tested in a three electrode configuration, as shown in FIG. 23. In the battery test set up 800, cathode 802 on aluminum mesh 804 is place in container 806. Container 806 holds liquid electrolyte 808. Counter electrode 810 and reference electrode 812 are also placed into container 806. Lithium metal was used as both counter electrode and reference electrode. The electrodes are connected to a battery testing system 814. No separator was needed for this testing configuration. The liquid electrolyte (from Merck & Co., Inc.) was 1M $LiClO_4$ in propylene carbonate.

Charge and discharge experiments were conducted at an approximately constant current equivalent to about 5 mA per gram of oxide within the electrode. Each electrode contained about 10 mg of nanoparticles. Thus, the currents were about 0.05 mA. The cells were initially charged from their open-circuit voltage up to 4.3 volts and then discharged down to 2.0 volts.

Figure 28:
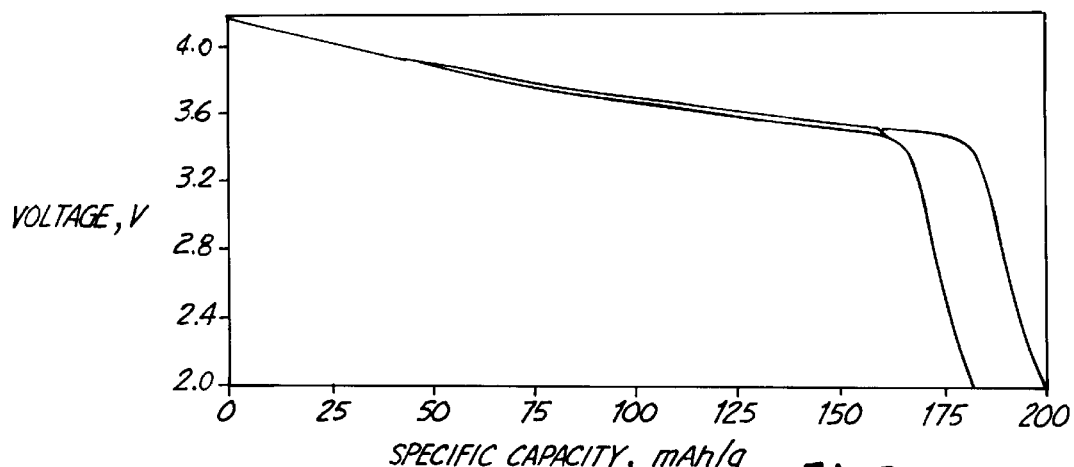
FIG. 28 is a plot of voltage as a function of specific capacity for the crystalline lithium nickel cobalt nanoparticles over the first discharge cycle.
Figure 29:
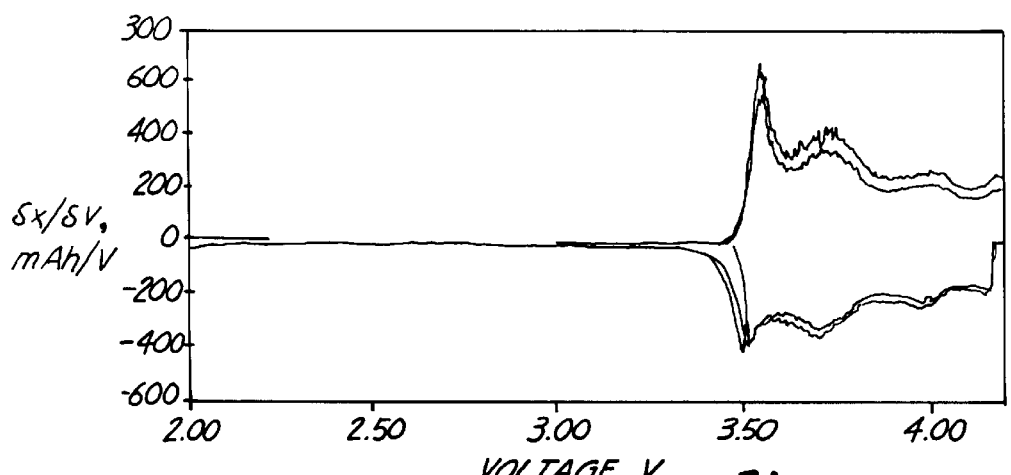
FIG. 29 is a plot of differential capacity as a function of voltage for nanoparticles of crystalline lithium nickel cobalt oxide.

A discharge curve is plotted in FIG. 28 for two comparably prepared samples. The lithium nickel cobalt oxide nanoparticles displayed a discharge capacity of about 199.5 mAh/gm for the first electrode and 182.3 mAh/gm for the second electrode. The differential capacity of the nanoparticles is plotted in FIG. 29 over a charging cycle and a discharging cycle.

Example 8

Beaker Cell Testing of Lithium Titanium Oxides

The specific capacity of nanoparticles of lithium titanium oxide ($Li_4Ti_5O_{12}$) particles was evaluated in a beaker cell test.

The experiment was set up in a beaker cell as described above in Example 5. A discharge rate of 5 mA/g was used. The cathode incorporating lithium titanium oxide nanoparticles was prepared as described in Example 5. Lithium metal was used as the anode.

Figure 30:
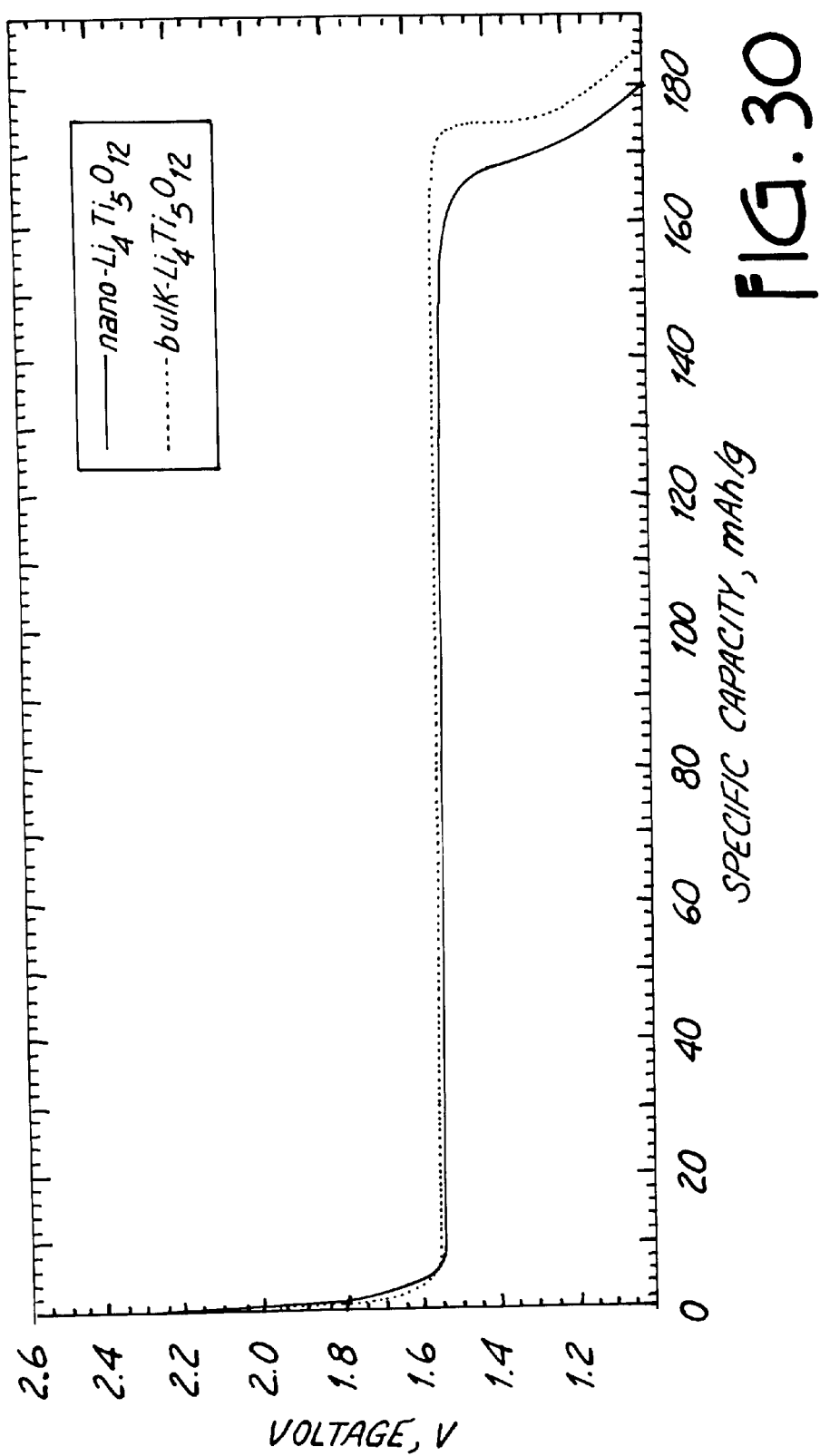
FIG. 30 is a plot of voltage as a function of specific capacity for lithium titanium oxide nanoparticles and bulk lithium titanium oxide using a beaker cell apparatus.

A plot of voltage as a function of specific capacity is shown in FIG. 30. The solid line plot indicates the results for nanoparticles of lithium titanium oxide, and the dashed line plot indicates the results obtained with the lithium titanium oxide produced from commercial titanium dioxide (bulk lithium titanium oxide). The lithium titanium oxide nanoparticles had a specific capacity of about 180 mAh/g to a 1.0 V cutoff with almost 90% of the capacity at about 1.55 volts. The results were reproducible in additional cells. For these material, the bulk lithium titanium oxide had a discharge capacity of about 7 % higher than the corresponding nanoparticles, and the nanoparticulate lithium titanium oxide had a discharge voltage about 35 mV lower than the corresponding bulk material.

Example 9

Cycling Properties of Lithium Titanium Oxide Nanoparticles

In this example, the cycling properties of lithium titanium oxide ($Li_4Ti_5O_{12}$) are presented.

Two electrode cells were produced as described in Example 6 with the following changes. The cathodes were produced using lithium titanium oxide powders produced as described in Example 4 with 78 percent by weight lithium titanium oxide, 10 percent by weight carbon and 12 percent by weight PVdF binder (type 741 nanoparticles and type 301F for commercial/bulk lithium titanium oxide). For the $Li_4Ti_5O_{12}$ nanoparticle containing electrodes, the carbon was a one-to-one ratio of compressed carbon black (H-M Royal, Buena Park, Calif.) and KS-4 graphite (4 micron round graphite, Timcal Corp., Westlake, Ohio). In the electrode produced with the bulk $Li_4Ti_5O_{12}$, the carbon was a mixture of BP 2000 with an average 12 nm diameter size (Cabot Corp., Billerica, Mass.) and KS-4 graphite.

Figure 31:
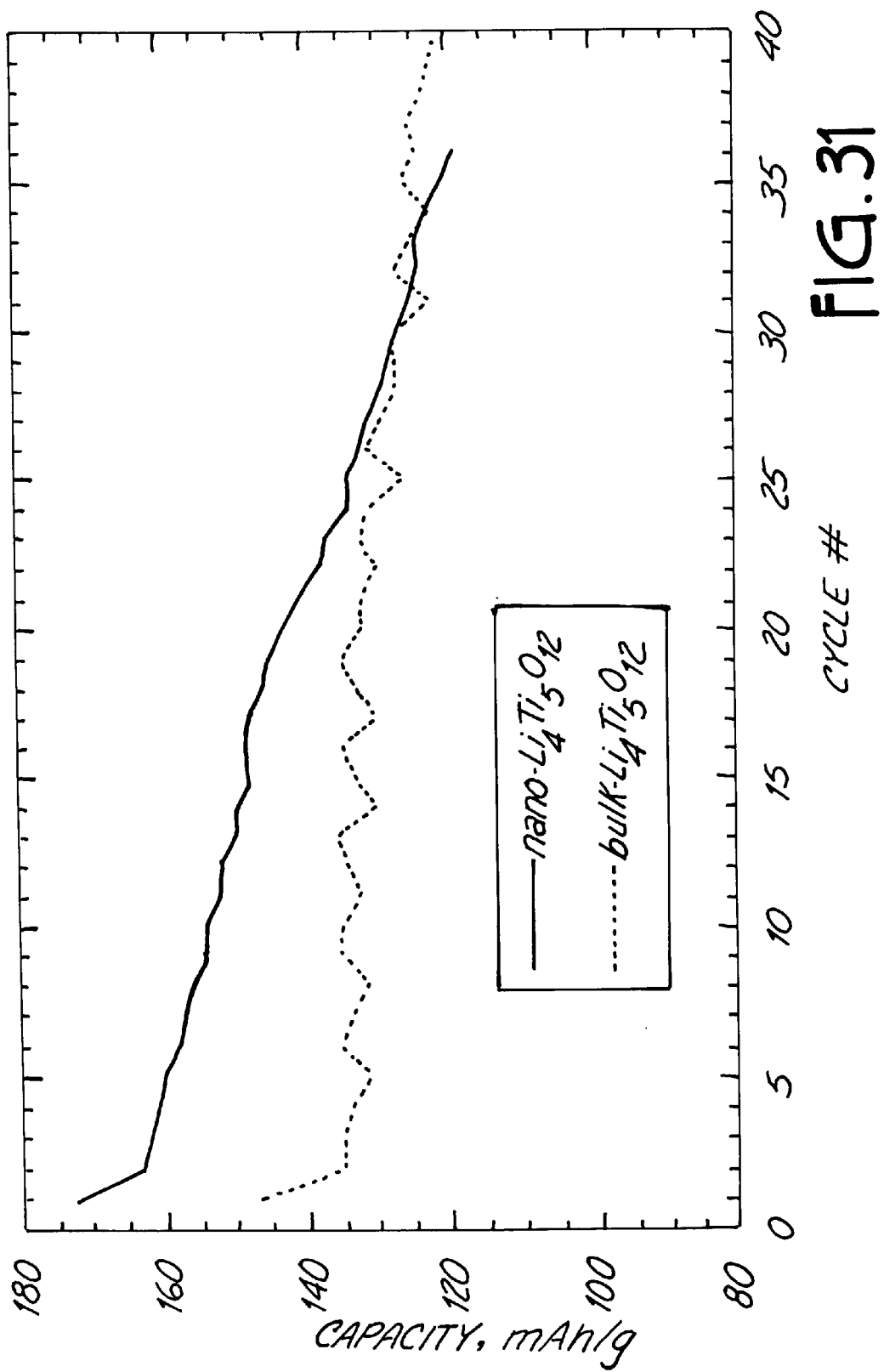
FIG. 31 is a plot of specific capacity as a function of discharge cycle using a two electrode cells produced with lithium titanium nanoparticles or bulk lithium titanium oxide particles.

A comparison of the electrochemical cycling stability between nanoparticles of $Li_4Ti_5O_{12}$ and particles produced from commercial titanium dioxide is shown in FIG. 31. The cells were cycled between 2.0 volts and 1.3 volts. The data for the nanoparticles of $Li_4Ti_5O_{12}$ is an average over two cell while the cycling results from the bulk lithium titanium oxide powders were obtained with only one cell. The discharge rate beyond the first cycle for the cell formed with nanoparticles of lithium titanium oxide was about three times greater than form the cell made with bulk lithium titanium oxide (about 30 mA/g versus about 11 mA/g). During the first discharge cycle, rates were slightly lower for the cell with nanoparticles of lithium titanium oxide (7.5 mA/g versus 11 mA/g).

The cells produced with the nanoparticles had a significantly higher capacity over the first cycle. This initial capacity improvement can be attributed, at least in part, to a high rate capability of the nanoparticles. However, the cells produced with the lithium titanium oxide nanoparticle had more fade such that by about 30 cycles the cell had similar specific capacities. At least some of the higher fading of capacity with the nanoparticulate $Li_4Ti_5O_{12}$ can be attributed to the lithium negative electrode.

The embodiments described above are intended to be illustrative and not limiting. Additional embodiments are within the claims below. Although the present invention has been described with reference to preferred embodiments, workers skilled in the art will recognize that changes may be made in form and detail without departing from the spirit and scope of the invention.

What is claimed is:

1. A method of producing lithium metal oxide particles wherein the metal comprises a metal-1 and a metal-2, the method comprising heating precursor particles in an oxidizing atmosphere, the precursor particles being formed by reacting a precursor aerosol the precursor aerosol comprising precursor compounds of lithium, metal-1 and metal-2, wherein the relative amounts of lithium, metal-1 and metal-2 are selected to yield a desired stoichiometry of the resulting lithium metal oxide particles, wherein effectively no lithium metal oxide particles have a diameter greater than about 4 times the average particle diameter of the lithium metal oxide particles.

2. The method of claim 1 wherein the lithium metal oxide particles have an average diameter less than about 100 nm.

3. The method of claim 1 wherein the lithium metal oxide further comprises aluminum, and wherein metal-1 is nickel and metal-2 is cobalt.

4. A method of producing lithium metal oxide particles wherein the metal comprises a metal-1 and a metal-2, the method comprising heating precursor particles in an oxidizing atmosphere, the precursor particles being formed by reacting a precursor aerosol in a flow that intersects a radiation beam and wherein energy absorbed from the radiation beam drives the reaction, the precursor aerosol comprising precursor compounds of lithium, metal-1 and metal-2, wherein the relative amounts of lithium, metal-1 and metal-2 are selected to yield a desired stoichiometry of the resulting lithium metal oxide particles.

5. The method of claim 1, and wherein the precursor particles are stirred during heating.

6. The method of claim 1, and wherein the heating of the precursor particles occurs in an oven.

7. The method of claim 1, and wherein the oxidizing atmosphere is static.

8. The method of claim 1, and wherein the oxidizing atmosphere is flowing.

9. The method of claim 1, and wherein the heating step occurs at a temperature between about 50° C. and about 1000° C.

10. The method of claim 1, and wherein the heating step occurs at a temperature between about 400° C. and about 750° C.

11. The method of claim 1, and wherein the step of heating is maintained for a time sufficient to achieve equilibrium.

12. The method of claim 1 and wherein the heating step is maintained for a time greater than about 5 minutes.

13. The method of claim 1 and wherein the heating step is maintained for a time between about 10 minutes and about 120 hours.

14. The method of claim 1 and wherein the heating step is maintained for a period between about 10 minutes and about 5 hours.

15. The method of claim 1 wherein metal-1 is nickel.

16. The method of claim 15 wherein metal-2 is cobalt.

17. The method of claim 1 wherein metal-2 is selected from the group consisting of Mn, B, Al, Mg, Ga, Ba, Sr, Ca, Cr, Fe, V, Ti or combinations thereof.

18. The method of claim 1 wherein metal-1 is cobalt.

19. The method of claim 18 wherein metal-2 is selected from the group consisting of Mn, B, Al, Mg, Ba, Sr, Ca, Cr, Fe, V, Ti and combinations thereof.

20. The method of claim 1 wherein metal-1 is titanium and metal-2 is aluminum.

21. The method of claim 4 wherein the lithium metal oxide particles have an average diameter less than about 100 nm.

22. The method of claim 4 wherein the precursor particles are stirred during heating.

23. The method of claim 4 wherein the heating step is maintained for a time greater than about 5 minutes.

24. The method of claim 4 wherein the radiation beam comprises a light beam.

25. A method of producing lithium metal oxide particles wherein the metal comprises a metal-1 and a metal-2, the method comprising heating precursor particles in an oxidizing atmosphere, the precursor particles being formed by reacting a precursor aerosol, the precursor aerosol comprising precursor compounds of lithium, metal-1 and metal-2 wherein metal-1 is selected from the group consisting of titanium, aluminum, and lanthanum.

26. The method of claim 25 wherein the resulting lithium metal oxide comprises lithium titanium aluminum oxide.

27. The method of claim 25 wherein the lithium metal oxide comprises $Li_4Ti_3Al_2O_{12}$.

28. The method of claim 25 wherein the lithium metal oxide comprises $LiTiAlO_4$.

29. The method of claim 25 wherein the resulting lithium metal oxide comprises lithium titanium lanthanum oxide.

30. The method of claim 25 wherein the lithium metal oxide comprises $Li_{0.33}La_{0.56}TiO_3$.

31. The method of claim 25 wherein the lithium metal oxide particles have an average diameter less than about 100 nm.

32. The method of claim 25 wherein the reacting of the precursor aerosol is performed in a flow that intersects a radiation beam and wherein energy absorbed from the radiation beam drives the reaction.

33. The method of claim 32 wherein the radiation beam comprises a light beam.

34. The method of claim 25 wherein the precursor particles are stirred during heating.

35. The method of claim 25 wherein the step of heating is maintained for a time sufficient to achieve equilibrium.

36. A method of producing lithium nickel metal oxide particles wherein the metal comprises chromium, boron, barium, gallium, strontium, calcium, iron, titanium or combinations thereof, the method comprising heating precursor particles in an oxidizing atmosphere, the precursor particles being formed by reacting a precursor aerosol, the precursor aerosol comprising precursor compounds of lithium, nickel and the metal, wherein effectively no lithium nickel metal oxide particles have a diameter greater than about 4 times the average particle diameter of the lithium nickel metal oxide particles.

37. The method of claim 36 wherein the relative amounts of lithium, nickel, and the metal are selected to yield a desired stoichiometry of the resulting lithium nickel metal oxide particles.

38. The method of claim 36 wherein the lithium nickel metal oxide particles have an average diameter less than about 100 nm.

39. The method of claim 36 wherein the reacting of the precursor aerosol is performed in a flow that intersects a radiation beam and wherein energy absorbed from the radiation beam drives the reaction.

40. The method of claim 39 wherein the radiation beam comprises a light beam.

41. A method of producing lithium cobalt metal oxide particles wherein the metal comprises chromium, boron, barium, strontium, calcium, iron, titanium or combinations thereof, the method comprising heating precursor particles in at oxidizing atmosphere, the precursor particles being formed by reacting a precursor aerosol, the precursor aerosol comprising precursor compounds of lithium, cobalt and the metal, wherein effectively no lithium cobalt metal oxide particles have a diameter greater than about 4 times the average particle diameter of the lithium cobalt metal oxide particles.

42. The method of claim 41 wherein the relative amounts of lithium, cobalt, and the metal are selected to yield a desired stoichiometry of the resulting lithium cobalt metal oxide particles.

43. The method of claim 41 wherein the lithium cobalt metal oxide particles have an average diameter less than about 100 nm.

44. The method of claim 41 wherein the reacting of the precursor aerosol is performed in a flow that intersects a radiation beam and wherein energy absorbed from the radiation beam drives the reaction.

45. The method of claim 41 wherein the radiation beam comprises a light beam.

* * * * *

UNITED STATES PATENT AND TRADEMARK OFFICE
CERTIFICATE OF CORRECTION

PATENT NO.   : 6,749,648 B1
DATED        : June 15, 2004
INVENTOR(S)  : Sujeet Kumar and Craig R. Horne It is certified that error appears in the above-identified patent and that said Letters Patent is hereby corrected as shown below:

Title page,
Item [73], Assignee, delete "NanaGram Corporation" and insert -- NanoGram Corporation --.

Signed and Sealed this

Seventeenth Day of August, 2004

JON W. DUDAS
*Acting Director of the United States Patent and Trademark Office*